(12) United States Patent
Sawaya et al.

(10) Patent No.: US 7,636,737 B2
(45) Date of Patent: Dec. 22, 2009

(54) WEB SITE MULTI-STAGE RECYCLING

(75) Inventors: Samer Fouad Sawaya, Redmond, WA (US); Chak Ming Li, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 300 days.

(21) Appl. No.: 11/312,318

(22) Filed: Dec. 20, 2005

(65) Prior Publication Data
US 2007/0143351 A1    Jun. 21, 2007

(51) Int. Cl.
G06F 12/00    (2006.01)
G06F 17/30    (2006.01)

(52) U.S. Cl. ..................... 707/200; 707/202
(58) Field of Classification Search .............. 707/202
See application file for complete search history.

(56) References Cited

U.S. PATENT DOCUMENTS

| | | | |
|---|---|---|---|
| 6,446,091 B1* | 9/2002 | Noren et al. | 707/202 |
| 6,615,224 B1* | 9/2003 | Davis | 707/202 |
| 7,058,664 B1* | 6/2006 | Hsu | 707/200 |
| 7,392,234 B2* | 6/2008 | Shaath et al. | 707/1 |
| 2002/0188758 A1* | 12/2002 | Nakajima et al. | 709/245 |
| 2002/0188942 A1* | 12/2002 | Bryan et al. | 717/176 |
| 2003/0220949 A1* | 11/2003 | Witt et al. | 707/204 |
| 2004/0158510 A1* | 8/2004 | Fisher | 705/30 |
| 2004/0243624 A1* | 12/2004 | Marwah | 707/103 R |
| 2005/0021915 A1* | 1/2005 | Lowe et al. | 711/154 |
| 2005/0171947 A1* | 8/2005 | Gautestad | 707/5 |
| 2006/0047698 A1* | 3/2006 | Fox | 707/103 X |
| 2006/0064434 A1* | 3/2006 | Gilbert et al. | 707/104.1 |
| 2006/0074956 A1* | 4/2006 | Marwah | 707/101 |
| 2006/0106841 A1* | 5/2006 | Bybee et al. | 707/101 |

(Continued)

FOREIGN PATENT DOCUMENTS

KR    0046018 A    6/2003

(Continued)

OTHER PUBLICATIONS

Robert Cowart and Brian Knittel; Special Edition Using Microsoft Windows 2000 Professional; Feb. 24, 2000; Que.*

(Continued)

*Primary Examiner*—Mohammad Ali
*Assistant Examiner*—Griselle Corbo
(74) *Attorney, Agent, or Firm*—Merchant & Gould P.C.

(57) ABSTRACT

Web sites, such as collaborative web sites, support a multi-stage recycling bin scheme in which items erroneously deleted from a web site can be restored to the web site. In a multi-stage recycling bin scheme a user deletes an item from a web site to a user recycle bin. The item is also deleted to a web site first stage recycle bin. On a subsequent delete of the item from the user recycle bin, the item is deleted from the user's recycle bin and the web site first stage recycle bin to a web site second stage recycle bin. Only when the item is deleted for a third time, from the web site second stage recycle bin, is the item permanently deleted from the web site. Prior to a permanent delete from the web site second stage recycle bin, an item can be restored to the web site.

22 Claims, 17 Drawing Sheets

U.S. PATENT DOCUMENTS

| | | | |
|---|---|---|---|
| 2006/0238822 A1* | 10/2006 | Van Hoof | 358/402 |
| 2006/0259461 A1* | 11/2006 | Kapur | 707/2 |
| 2006/0288044 A1* | 12/2006 | Kashiwagi et al. | 707/200 |
| 2007/0130232 A1* | 6/2007 | Therrien et al. | 707/204 |
| 2008/0083037 A1* | 4/2008 | Kruse et al. | 726/27 |

FOREIGN PATENT DOCUMENTS

| | | |
|---|---|---|
| KR | 0071346 A | 9/2003 |
| WO | 99035576 A1 | 7/1999 |
| WO | 02042925 A1 | 5/2002 |

OTHER PUBLICATIONS

Adobe Creative Team; Adobe GoLive 5.0 Classroom in a Book; Oct. 4, 2000; Adobe Press.*

Robert Cowart and Brian Knittel; Special Edition Using Microsoft Windows 2000 Professional; Feb. 24, 2000; Que.*

Undelete for Windows User Manual; Oct. 2003; Executive Software International, Inc.*

Robert Cowart and Brian Knittel; Special Edition Using Microsoft Windows 2000 Professional; Feb. 24, 2000; Que.*

Undelete for Windows User Manual; Oct. 2003; Executive Software International, Inc.*

International Search Report dated May 1, 2007 for Application No. PCT/US2006/047502, 11 pages.

* cited by examiner

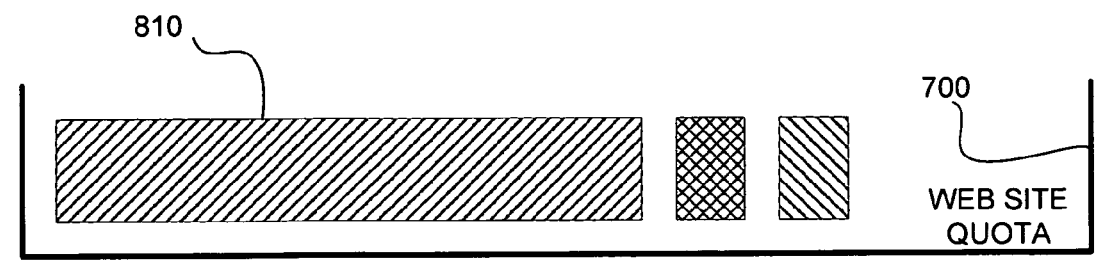
FIG. 8A
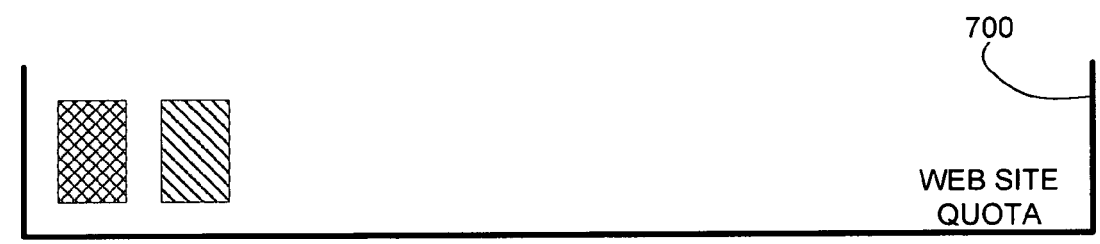
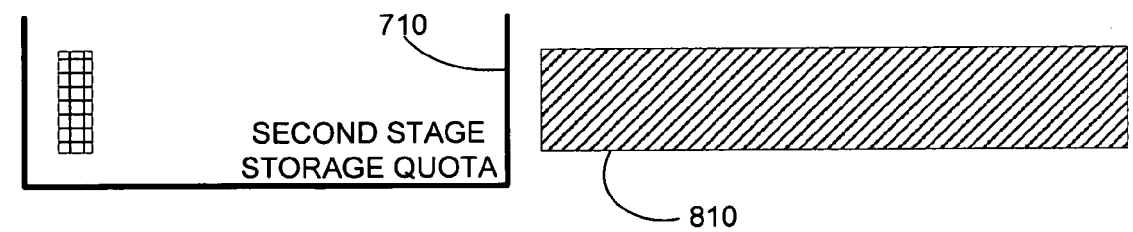
FIG. 8B

Use this page to restore items that you have deleted from this site or to empty deleted items. Items that were deleted more than 30 days ago will be automatically emptied.

| | Type | Name | Original Location | Created By | Deleted | File Size |
|---|---|---|---|---|---|---|
| ☐ | 📄 | Draft Doc Reqs | http://team/sites/ABC/Lists | Tom Day | 2/3/2004 11:22 AM | 1 KB |
| ☐ | 📄 | Benefits | http://team/sites/ABC/Legal | Joan Arc | 2/3/2004 1:42 AM | 43 KB |
| ☐ | 📄 | AB Presentation | http://team/sites/ABC/Setup | Ed Jones | 2/1/2004 9:32 AM | 201 KB |
| ☐ | 📄 | New Feature | http://team/sites/ABC/Finance | Sue Smith | 12/30/2003 5:02 PM | 45 KB |

↻ Restore Selection
1020

✗ Delete Selection
1030

FIG. 10

| Select a View | Use this page to restore items that users have deleted from this site, or to empty deleted items. Items that were deleted more than 30 days ago will be automatically emptied. 1115 | | | |
|---|---|---|---|---|
| End user Recycle Bin Items 1120 | ↺ Restore Selection 1020 | ✗ Delete Selection 1030 | 🗑 Empty Recycle Bin 1150 | |
| Deleted from end user Recycle Bin 1130 | ☐ Type Name | Original Location | Created By Deleted By | Deleted File Size |
| | ☐ 🗎 Draft Reqs | http://team/ABC/Lists | 👤 Tom Day 👤 Tom Day | 2/3/2004 11:22 AM 1 KB |
| | ☐ 🗎 Benefits | http://team/ABC/Legal | 👤 Joan Arc 👤 Tom Day | 2/3/2004 1:42 AM 43 KB |
| | ☐ 🗎 AB Reqs | http://team/ABC/Setup | 👤 Ed Jones 👤 Ed Jones | 2/1/2004 9:32 AM 201 KB |
| | ☐ 🗎 New Set | http://team/ABC/Acct | 👤 Sue Smith 👤 Ed Lee | 12/30/2003 5:02 PM 45 KB |
| | 1010 1040 1050 | 1060 | 1070 | 1080 1090 |
| 1140 | 1100 | | | 1160 |

FIG. 11

WEB SITE MULTI-STAGE RECYCLING

BACKGROUND

Web site users can delete items, such as files, folders, etc., from the web site. Unfortunately some deletes are erroneous. For example, some deletes from a web site are unintentional or mistaken, i.e., web site users can and do delete items they did not intend to delete, and which they really desire to continue to access. Additionally, erroneous deletes occur on multi-user, or collaborative, web sites when one web site user deletes an item that another user desires to continue to access. These erroneous deletes are problematic when there is no solution for easily restoring the deleted items.

If, for example, upon an erroneous delete of an item from a web site a database restoration or other action for restoring a past backup of the website is required to recover the item, the overall system effectiveness is compromised. Users get frustrated by the delay in accessing needed items that have been erroneously deleted, and may even resort to spending time recreating the deleted item rather than waiting for it to be restored. Moreover, system administrators become burdened with database or web site restores that take their effort from other, often more system-critical, activities. These problems are compounded exponentially when more users become active on a web site.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include technology that provides for quick and easy recoveries of items web site users have deleted from a web site. Embodiments also discussed herein include technology that allows web site administrators to manage items deleted from the web sites they support.

In an embodiment, a multi-stage recycle bin model is implemented for deleting items from a web site. A first stage delete occurs when a user deletes an item from a web site. Upon the user's delete the item no longer appears on the web site but does appear in the user's recycle bin and in a web site administrator's first recycle bin. A second stage delete occurs when the item is deleted from the user's recycle bin or from the web site administrator's first recycle bin. In a second stage delete, the item no longer appears in the user's recycle bin or the web site administrator's first recycle bin but does now appear in a web site administrator's second recycle bin.

In an embodiment, after a first stage delete, either the user or a web site administrator can restore the item to the web site. After a second stage delete, a web site administrator can restore the item to the web site. Alternatively, in an embodiment, if a web site administrator deletes the item from the web site administrator's second recycle bin the item is permanently deleted from the web site.

In an aspect of an embodiment, an auto-cleanup service is implemented to automatically permanently delete old recycle bin items. In another aspect of an embodiment, a memory quota devoted to the web site administrator's second recycle bin items can be determined and adjusted by a web site administrator as a control mechanism for the web site's storage usage.

BRIEF DESCRIPTION OF THE DRAWINGS

These and other features will now be described with reference to the drawings of certain embodiments and examples, which are intended to illustrate and not to limit the invention, and in which:

FIGS. 8A and 8B depict exemplary items associated with a web site in which a large item deleted from a user recycle bin does not fit in a web site administrator's recycle bin.

FIG. 10 illustrates an embodiment of a user interface for a user recycle bin.

FIG. 11 illustrates an embodiment of a user interface for a web site administrator's first recycle bin and for a web site administrator's second recycle bin.

DETAILED DESCRIPTION

In the following description, for purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid unnecessarily obscuring the invention.

Figure 1:
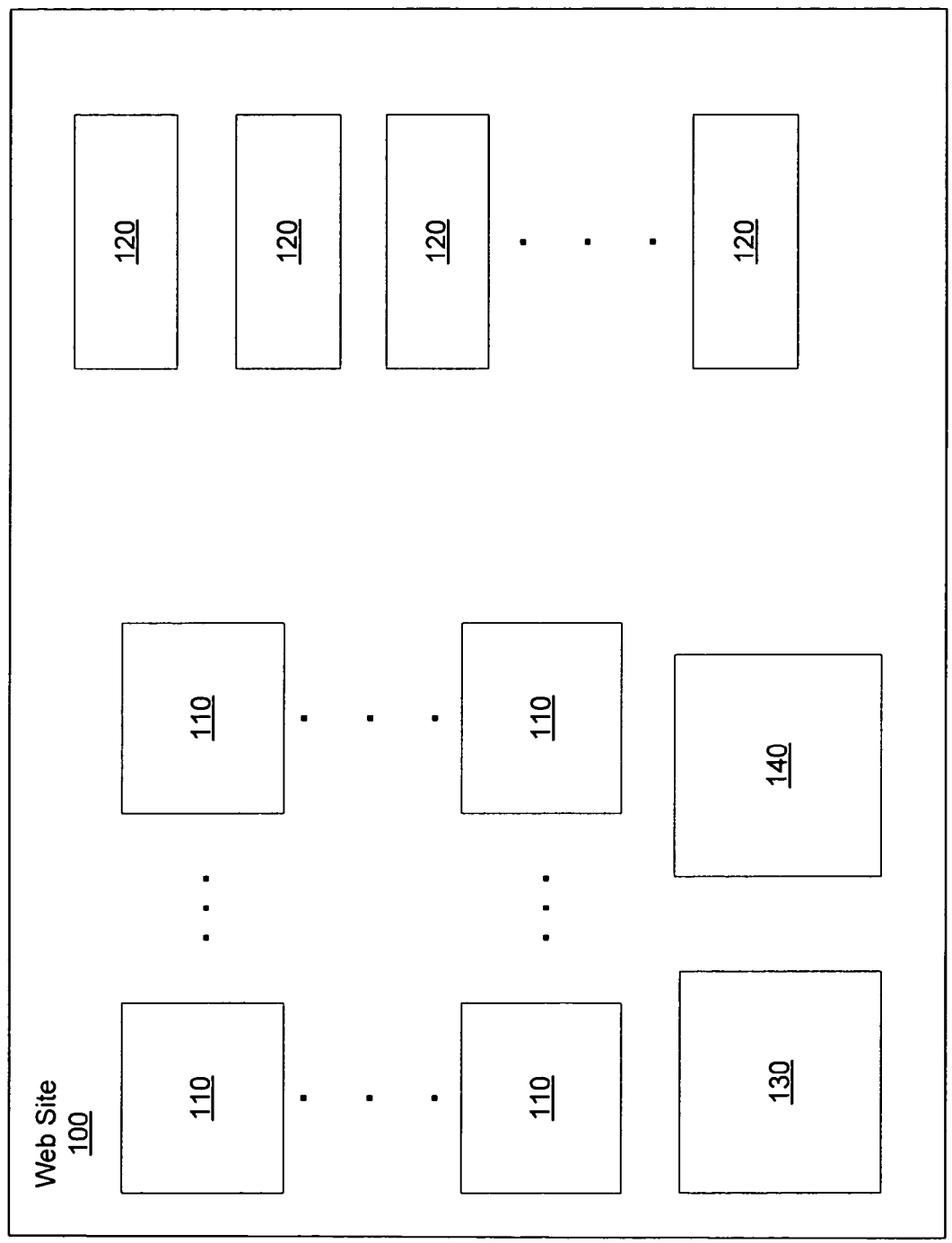
FIG. 1 is an embodiment web site supporting multi-stage recycling.

An embodiment exemplary web site 100, shown in FIG. 1, has various items 110. In an embodiment, web site 100 is a collaborative web site. The items 110 on web site 100 are also referred to as live items 110 herein as they are items 110 that are displayed to, and can be seen on the web site 100 and accessed by, the one or more users of the web site 100. The live items 110 can include, but are limited to, documents, folders, lists, list items, files, libraries, discussion boards, surveys and calendars.

In an embodiment, each user of the web site 100 has a user recycle bin 120 which is used for items the respective user deletes from the web site 100. Additionally, an administrator of the web site 100 has a first stage site collection recycle bin 130, also referred to herein as a first stage recycle bin 130. In an embodiment, the first stage recycle bin 130 contains all the items deleted by all the web site users into the user recycle bins 120, as further discussed below.

In an embodiment, a site collection administrator for the web site 100 has control over the use of the first stage recycle bin 130, i.e., the site collection administrator for the web site 100 can delete items from the first stage recycle bin 130 and can restore items in the first stage recycle bin 130 to the web site 100. In an alternative embodiment, a central administrator for the web site 100 has control over the use of the first stage recycle bin 130. In yet another alternative embodiment, both the site collection administrator and the central administrator for the web site 100 have control over the use of the first stage recycle bin 130. In still other alternative embodiments, alternative administrators with responsibility for the web site 100 individually, or in various combinations, have control over the use of the first stage recycle bin 130.

In an embodiment, an administrator of the web site 100 has a second stage site collection recycle bin 140, also referred to herein as a second stage recycle bin 140. In an embodiment, the second stage recycle bin 140 is used for items the users of the web site delete from the user recycle bins 120. In an embodiment, the second stage recycle bin 140 is also used for items the web site administrator deletes from the first stage recycle bin 130.

In an embodiment, the site collection administrator for the web site 100 has control over the use of the second stage recycle bin 140, i.e., the site collection administrator for the web site 100 can delete items from the first stage recycle bin 130 into the second stage recycle bin 140, delete items from the second stage recycle bin 140, and can restore items from the second stage recycle bin 140 to the web site 100. In an alternative embodiment, a central administrator for the web site 100 has control over the use of the second stage recycle bin 140. In yet another alternative embodiment, both the site collection administrator and the central administrator for the web site 100 have control over the use of the second stage recycle bin 140. In still other alternative embodiments, alternative administrators with responsibility for the web site 100 individually, or in various combinations, have control over the use of the second stage recycle bin 140.

Figure 2:
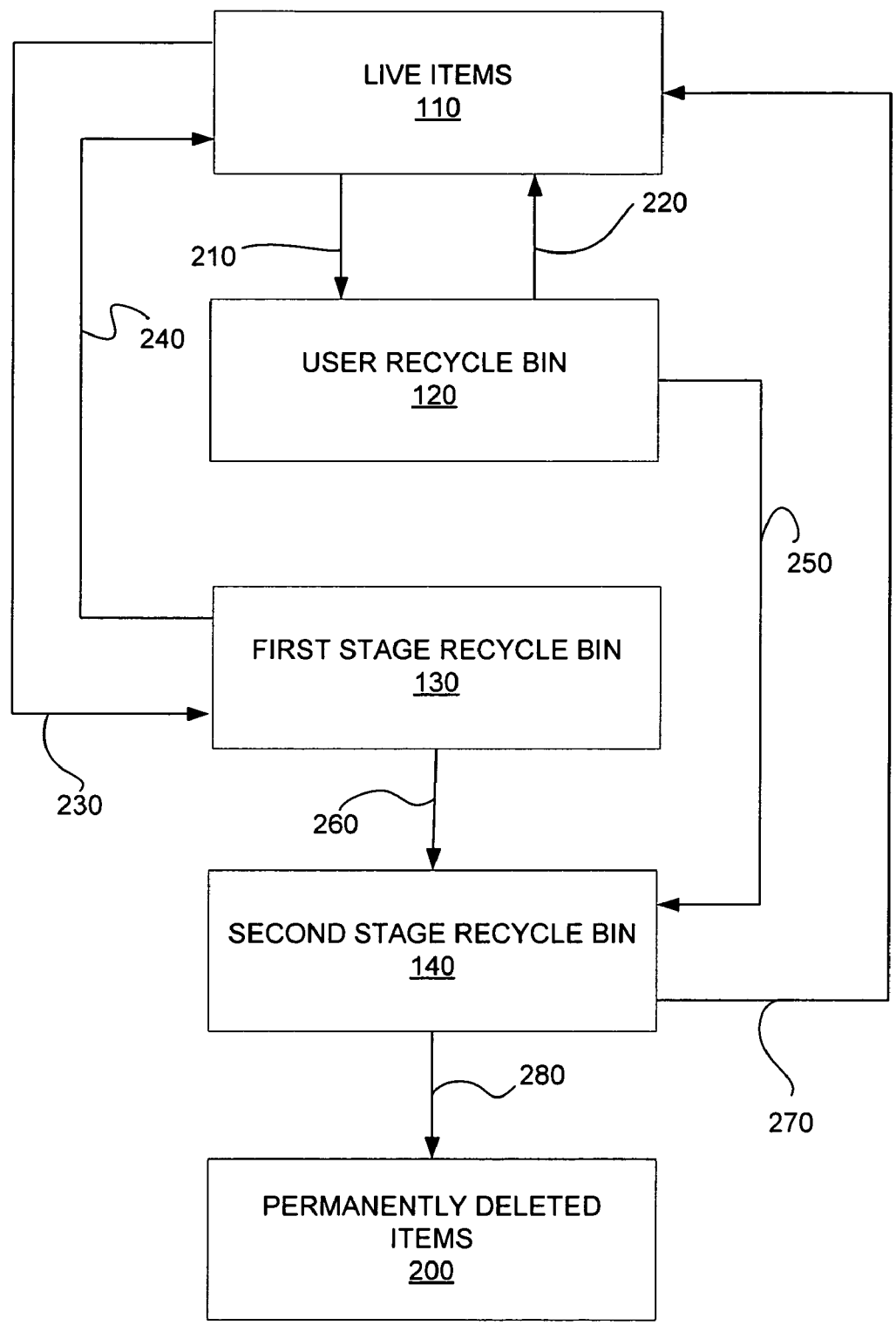
FIG. 2 depicts the path of item deletions and restorations in an embodiment multi-stage recycling scheme.

In a general embodiment, as shown in FIG. 2, live items 110 on a web site can be deleted 210 by a user of the web site. In an embodiment, the first delete action on a live item 110 on a web site 100 is a first stage delete. An item is deleted 210 by a user from the web site 100 to the user recycle bin 120 for the user. The user's delete action also causes the same item to be deleted 230 from the web site 100 to the first stage recycle bin 130.

A user can also restore 220 items from their user recycle bin 120 to the web site, where the restored items once more become live items 110. A user restoration of an item from a user recycle bin 120 also results in the same item being removed from the first stage recycle bin 130 as it is no longer a deleted item.

An appropriate web site administrator can restore 240 items from the first stage recycle bin 130 to the web site, where the restored items once more become live items 110. The web site administrator's restoration 240 of the item from the first stage recycle bin 130 also results in the same item being removed from the appropriate user recycle bin 120.

If a user deletes 250 an item from their user recycle bin 120 the item is deleted 250 to the second stage recycle bin 140. This second delete action of an item by a user also causes the same item to be deleted 260 from the first stage recycle bin 130 to the second stage recycle bin 140. In an embodiment, the second delete action on an item is a second stage delete.

An appropriate web site administrator can also execute a second stage delete, deleting 260 an item in the first stage recycle bin 130 to the second stage recycle bin 140. The administrator's delete 260 of an item from the first stage recycle bin 130 also results in the same item being removed from the appropriate user recycle bin 120.

An appropriate web site administrator can restore 270 items from the second stage recycle bin 140 to the web site, where the restored items once more become live items 110.

An appropriate web site administrator can alternatively permanently delete 280 items in the second stage recycle bin 140. A permanently deleted item 200 is removed or otherwise disassociated from the web site's database, or other storage, and can only be restored to the web site as a live item 110 by a database restoration, an action that restores a past backup of a website, or some other similar-resulting action.

In an embodiment, a permanent delete 280 is when an item is actually deleted from a web site. Prior to a permanent delete 280, when an item is deleted 210 from a web site to a user recycle bin 120, deleted 250 from a user recycle bin 120 to the second stage recycle bin 130, or deleted 260 from the first stage recycle bin 130 to the second stage recycle bin 140, the item is not yet removed or otherwise disassociated with the web site. In each of the deletes 210, 250 and 260, the item remains in the web site's storage, or otherwise remains associated with the web site 100, but is indicated as being deleted by appearing in one or more of the recycle bins 120, 130 and/or 140, and is removed from usage by the web site users.

In an embodiment, an appropriate web site administrator can disable the second stage recycle bin 140. When the second stage recycle bin 140 is disabled a user's delete of an item from their user recycle bin 120 is a permanent delete and the permanently deleted item 200 can only be restored as a live item 110 by a database restoration, an action for restoring a past backup of a web site, or some other similar-resulting action. Likewise, when the second stage recycle bin 140 is disabled an administrator's delete of an item from the first stage recycle bin 130 is also a permanent delete of the item.

In an embodiment, an appropriate web site administrator can disable all recycle bins, i.e., all user recycle bins 120, the first stage recycle bin 130 and the second stage recycle bin 140. When all recycle bins 120, 130 and 140 are disabled a user's delete of a live item 110 from a web site is a permanent delete of the item from the web site.

Figure 3A:
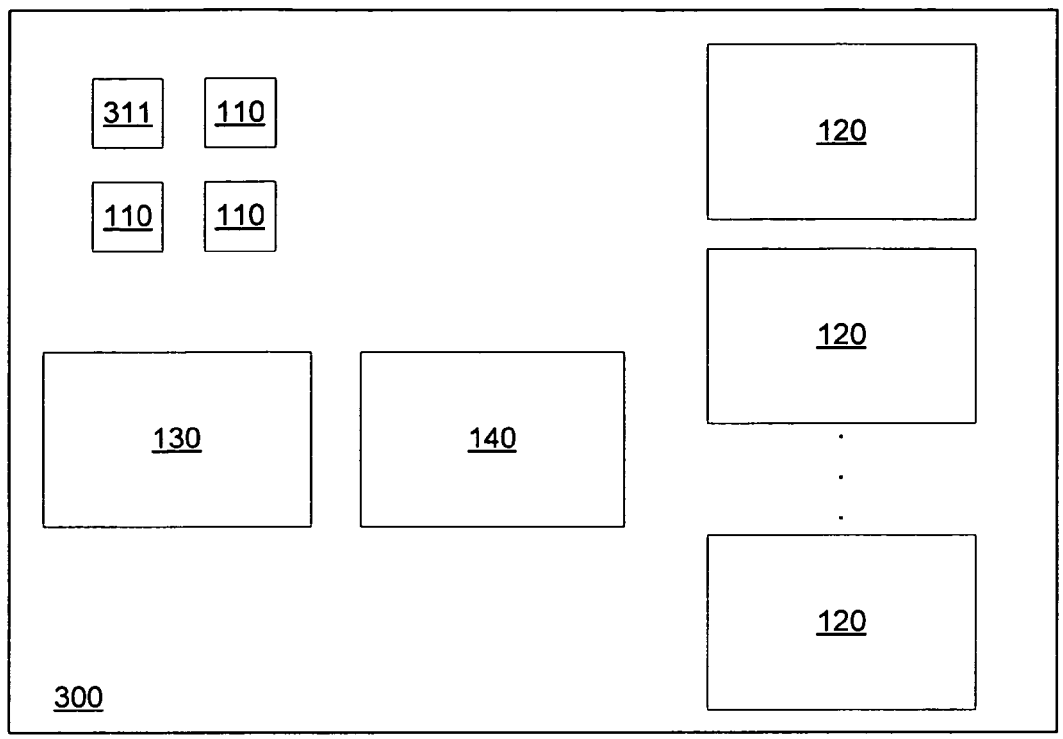
FIG. 3A is an exemplary web site with multi-stage recycling and no items deleted from the web site.
Figure 3B:
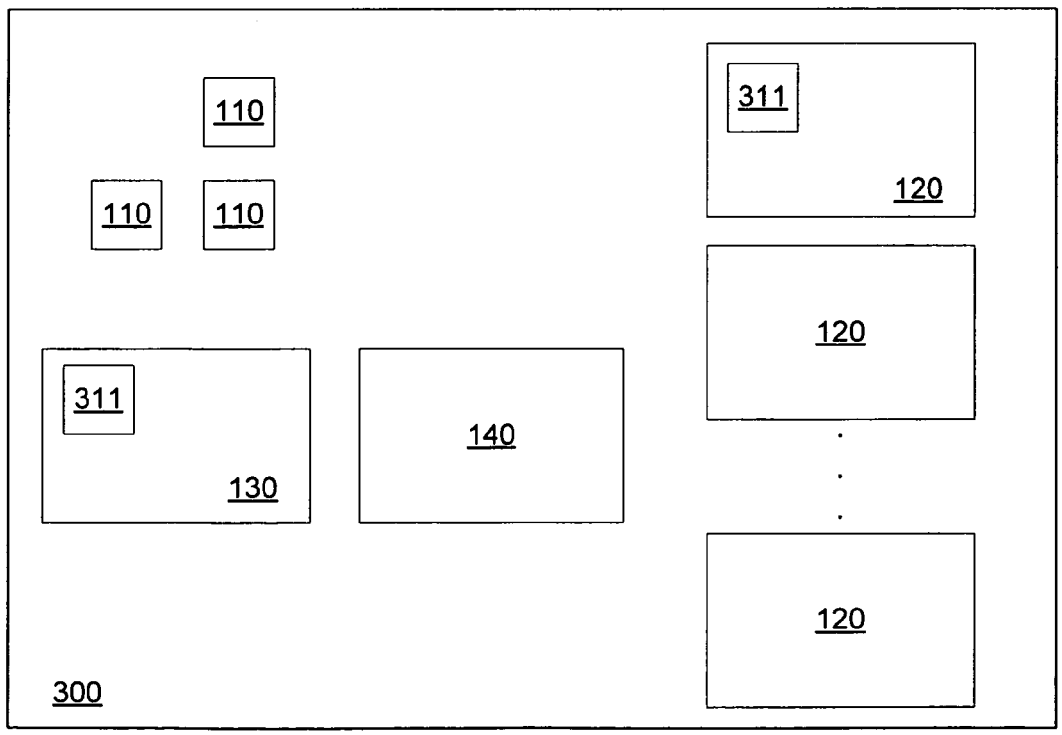
FIG. 3B depicts the web site of FIG. 3A after an item has been deleted by a user from the web site.

FIGS. 3A through 3D depict various exemplary deletes and restorations of a live item, e.g., item 311 of FIG. 3A, on a web site 300. In FIG. 3A, item 311 is a live item accessible to various web site users via the user interface for web site 300. Referring to FIG. 3B, when a web site user deletes live item 311, item 311 is removed from the web site 300 to the respective user's user recycle bin 120 and also to the first stage recycle bin 130. In an embodiment, item 311 is not permanently deleted from the web site 300 at this time. Upon this first stage delete, item 311 is removed from the web site user interface so it can no longer be seen as a live item by anyone, users or administrators, or used by anyone accessing the web site 300. The deleted item 311 is indicated in the user recycle bin 120 for the web site user who deleted it. The deleted item 311 is also indicated in the first stage recycle bin 130.

In an embodiment, upon a first stage delete item 311 is not actually physically moved to the user recycle bin 120 or the first stage recycle bin 130. At this juncture, the deleted item 311 remains in the web site's storage, or otherwise remains associated with the web site 300, although, as discussed above, it no longer appears as a live item in the web site user interface and it can no longer be used by anyone accessing the web site 300. In an embodiment, a record in a recycle bin table is established for the user recycle bin 120 and the first stage recycle bin 130 to indicate the deleted item 311 is in each of these recycle bins 120 and 130. The deleted item 311 is also displayed in the user recycle bin user interface and the first stage site collection recycle bin user interface.

Figure 3C:
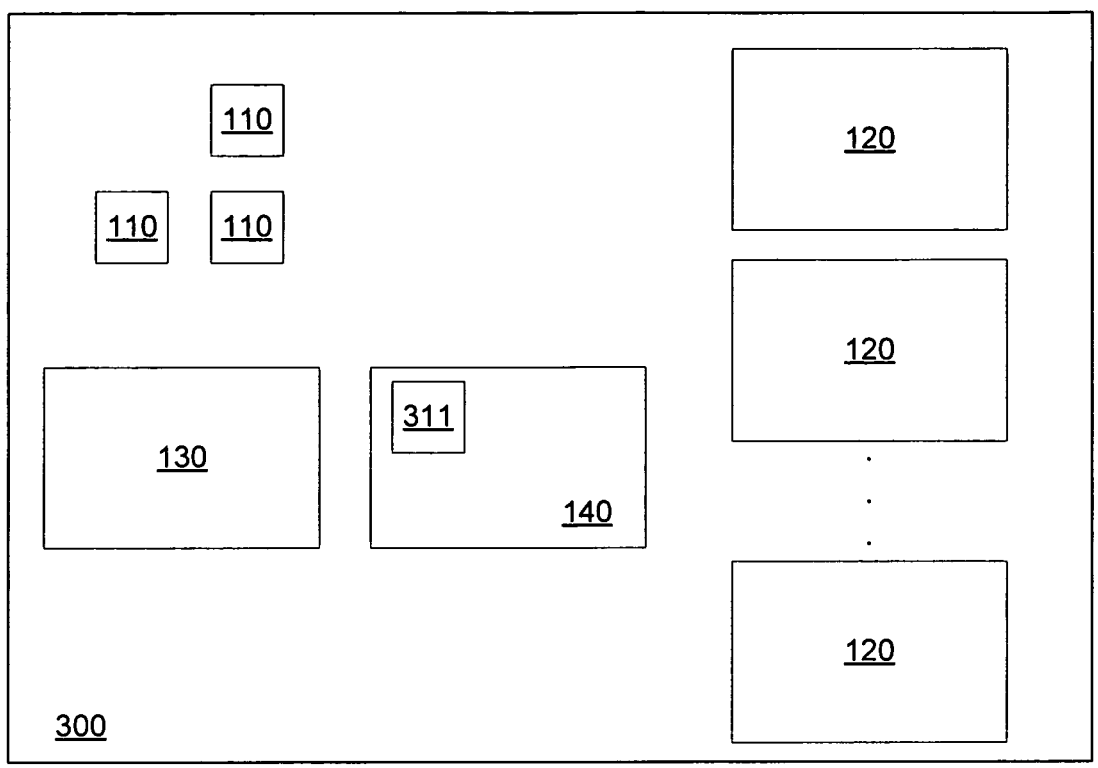
FIG. 3C depicts the web site of FIG. 3B after the item is again deleted.

If the user deletes the same item 311 from their user recycle bin 120, or a web site administrator deletes the item 311 from the first stage recycle bin 130, as shown in FIG. 3C, item 311 is deleted to the second stage recycle bin 140. In an embodiment, as item 311 was not actually physically moved to the user recycle bin 120 or the first stage recycle bin 130 in the first stage delete, it is not now physically removed from either of these recycle bins 120 and 130 in this second stage delete. In an embodiment, removing the deleted item 311 from the user recycle bin 120 and the first stage recycle bin 130 entails disassociating, or alternatively, deleting, the respective record for item 311 for the recycle bins 120 and 130 in the recycle bin table. Once item 311 is deleted from the user recycle bin 120 and the first stage recycle bin 130 it is no longer displayed in the user interface for either of these recycle bins 120 or 130.

In an embodiment, on a second stage delete item 311 is indicated in the second stage recycle bin 140. In an embodiment, item 311 is not actually physically moved to the second stage recycle bin 140 upon a second stage delete. In an embodiment, the previously established record for deleted item 311 in the recycle bin table is now associated with the second stage recycle bin 140. Alternatively, if the record for item 311 was deleted from the recycle bin table when item 311 was deleted from the user recycle bin 120 and the first stage recycle bin 130, a new record for item 311 is created in the recycle bin table and associated with the second stage recycle bin 140. Upon this second stage delete, item 311 is also displayed in the second stage recycle bin user interface.

Figure 3D:
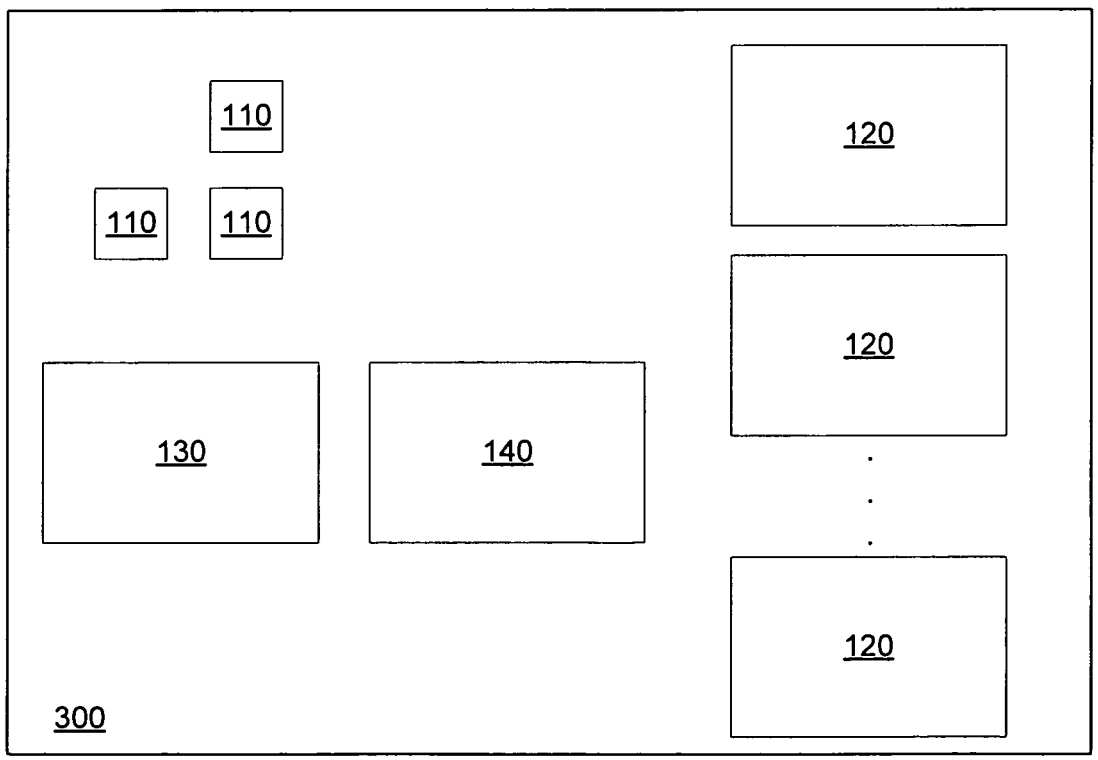
FIG. 3D depicts the web site of FIG. 3C after the item is permanently deleted from the web site.

Referring to FIG. 3D, if a web site administrator deletes item 311 from the second stage recycle bin 140, it is now permanently deleted from the web site 300. In an embodiment, removing the deleted item 311 from the second stage recycle bin 140 includes deleting or otherwise disassociating the respective record for item 311 for the recycle bin 140 in the recycle bin table. Once item 311 is deleted from the second stage recycle bin 140 it is no longer displayed in the user interface for this recycle bin 140. Additionally, upon the permanent delete of item 311 from the web site 300 item 311 can only be restored to the web site 300 via a database restore, an action for restoring a past backup of a web site, or some other similar-resulting action.

Referring again to FIG. 3B, if the user restores the deleted item 311 from the user recycle bin 120 to the web site 300 or a web site administrator restores item 311 from the first stage recycle bin 130 to the web site 300, item 311 is removed from the user recycle bin 120 and the first stage recycle bin 130. In an embodiment, as item 311 was not actually physically moved to the user recycle bin 120 or the first stage recycle bin 130 in the first stage delete, it is not now physically removed from either of these recycle bins 120 and 130 when it is restored to the web site 300. In an embodiment, removing item 311 from the user recycle bin 120 and the first stage recycle bin 130 entails deleting or otherwise disassociating the respective record for item 311 for the user recycle bin 120 and the first stage recycle bin 130 in the recycle bin table.

Once item 311 is restored from either the user recycle bin 120 or the first stage recycle bin 130 to the web site 300 it is no longer displayed in the user interface for either recycle bin 120 or recycle bin 130. As shown in FIG. 3A, item 311 is now a live item again, displayed on the web site user interface and accessible by users of the web site 300.

If a web site administrator restores the deleted item 311 shown in FIG. 3C from the second stage recycle bin 140 to the web site 300, item 311 is removed from the second stage recycle bin 140. In an embodiment, as item 311 was not actually physically moved to the second stage recycle bin 140 in the second stage delete, it is not now physically removed from the second stage recycle bin 140 when it is restored to the web site 300. In an embodiment, removing item 311 from the second stage recycle bin 140 entails deleting or otherwise disassociating the respective record for item 311 for the second stage recycle bin 140 in the recycle bin table.

Once item 311 is restored from the second stage recycle bin 140 to the web site 300 it is no longer displayed in the user interface for the second stage recycle bin 140. As seen in FIG. 3A, item 311 is again a live item, displayed on the web site user interface and accessible by users of the web site 300.

In an embodiment, when a web site user deletes a live item 110 with one or more dependent live items 110, i.e., a container item, from a web site to a user recycle bin 120, all of the container item's dependent items are also deleted to the user recycle bin 120 and the first stage recycle bin 130.

Figure 4A:
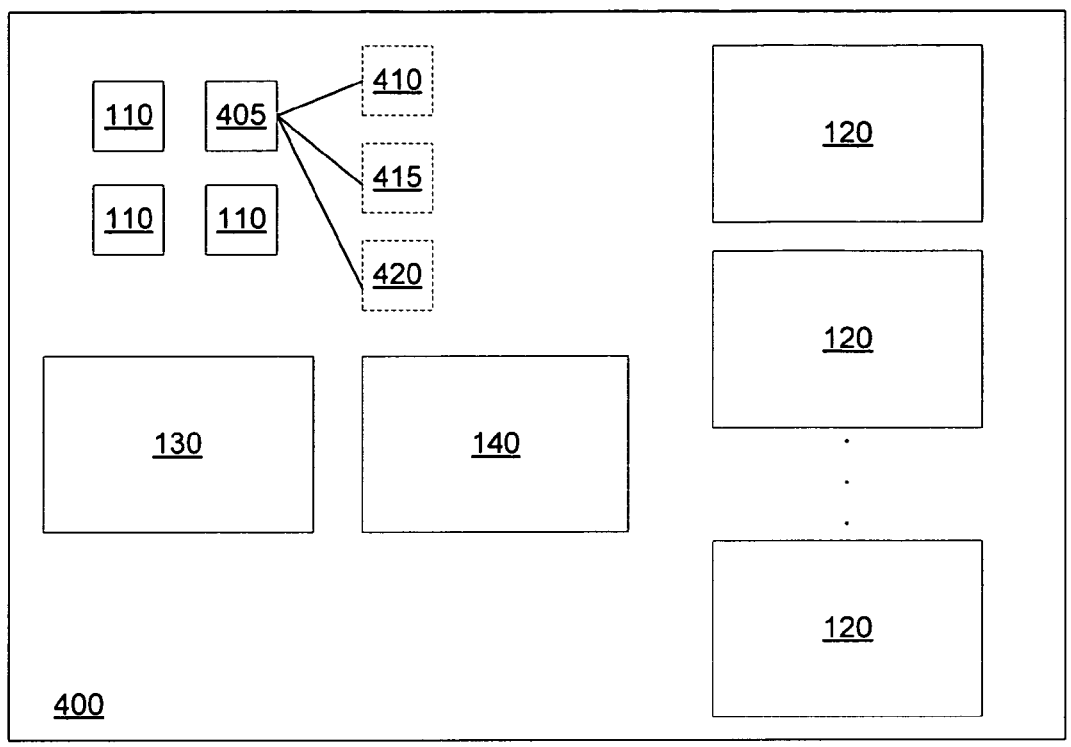
FIG. 4A is an exemplary web site with multi-stage recycling and a container item on the web site.
Figure 4B:
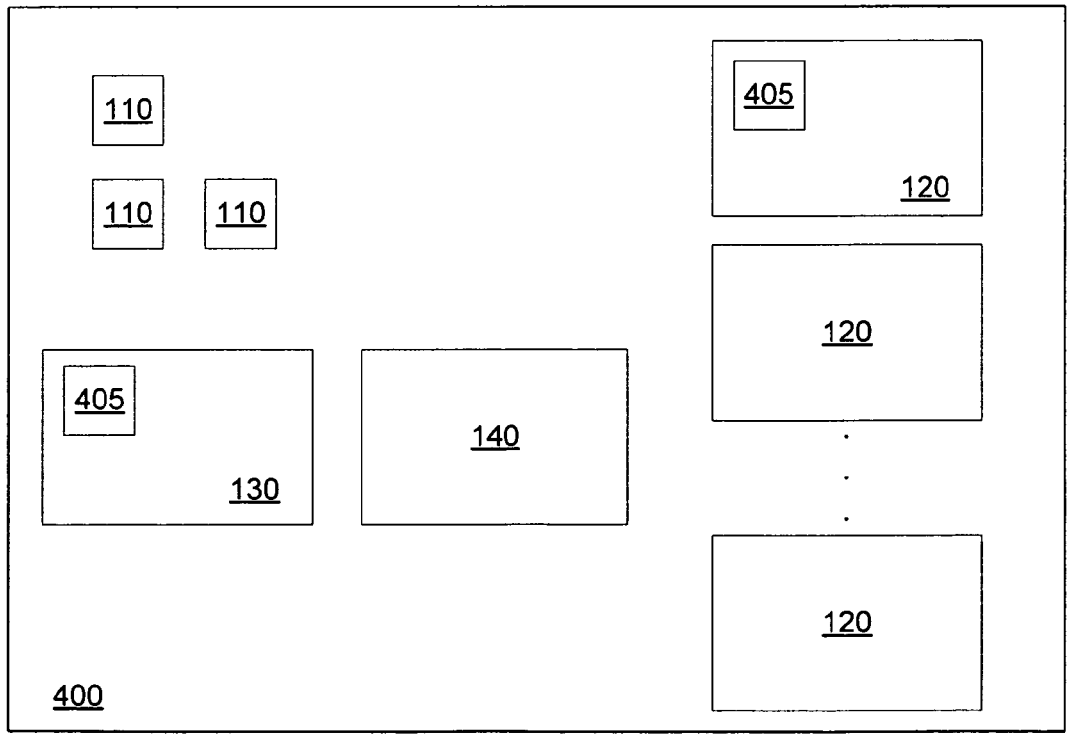
FIG. 4B depicts the web site of FIG. 4A after the container item has been deleted by a user from the web site.

Referring to FIG. 4A, exemplary live item 405 on the web site 400 is a library container item that contains file 410, file 415 and file 420. If a user deletes the library 405 from the web site 400, as shown in FIG. 4B, its dependent files 410, 415 and 420 are also deleted from the web site 400. In an embodiment, upon the user delete of the library 405 from the web site 400 only the deleted library item 405 is indicated in the user recycle bin 120 and the first stage recycle bin 130. In an embodiment, a container item is treated as one item in the user recycle bins 120 and the first stage recycle bin 130 regardless of the number of items dependent on, i.e., contained in, the container item.

In an alternative embodiment, when a user deletes the library 405 from the web site 400, library item 405 and each of its dependent file items 410, 415 and 420 are indicated in both the user recycle bin 120 and the first stage recycle bin 130. In this alternative embodiment, a container item and each of its dependent items appear as separate deleted items in the user recycle bins 120 and the first stage recycle bin 130.

In an aspect of this alternative embodiment, the dependent items that are deleted to a user recycle bin 120 and the first stage recycle bin 130 because their container item was deleted to these recycle bins 120 and 130 cannot be restored to the web site or, alternatively, deleted to the second stage recycle bin 140 unless their container item is restored to the web site, or alternatively, deleted to the second stage recycle bin 140. Referring to FIG. 4A, in this aspect of the alternative embodiment, files 410, 415 and 420 will be shown in the user recycle bin 120 and the first stage recycle bin 130 when their container library item 405 is deleted by a user to the user recycle bin 120. Files 410, 415 and 420 will also be shown in the first stage recycle bin 130, along with their container library item 405, when the container item 405 is deleted to the user recycle bin 120. However, none of the dependent files 410, 415 or 420 can be restored to the web site 400 apart from their container library item 405. In this aspect, files 410, 415 and 420 can only be restored to the web site 400 when and if their container library item 405 is restored to the web site 400. Additionally, in this aspect none of the dependent files 410, 415 or 420 can be deleted to the second stage recycle bin 140 apart from their container library item 405. In this aspect, files 410, 415 and 420 will only be deleted to the second stage recycle bin 140 when and if their container library item 405 is deleted to the second stage recycle bin 140.

In an alternative aspect of this alternative embodiment, the dependent items that are deleted to a user recycle bin 120 and the first stage recycle bin 130 because their container item was deleted to these recycle bins 120 and 130 can be individually restored, apart from their container item, to the web site, or, alternatively, individually deleted to the second stage recycle bin 140 apart from their container item. Referring to FIG. 4A, in this alternative aspect of the alternative embodiment, files 410, 415 and 420 will be shown in the user recycle bin 120 and the first stage recycle bin 130 when their container library item 405 is deleted by a user to the user recycle bin 120. Files 410, 415 and 420 will also be shown in the first stage recycle bin 130, along with their container library item 405, when the container item 405 is deleted to the user recycle bin 120. In this alternative aspect, files 410, 415 and 420 can individually, or in any combination, be restored to the web site 400 apart from their container library item 405. Additionally, in this alternative aspect each of the files 410, 415 and 420 can be deleted to the second stage recycle bin 140 apart from their container library item 405.

Figure 4C:
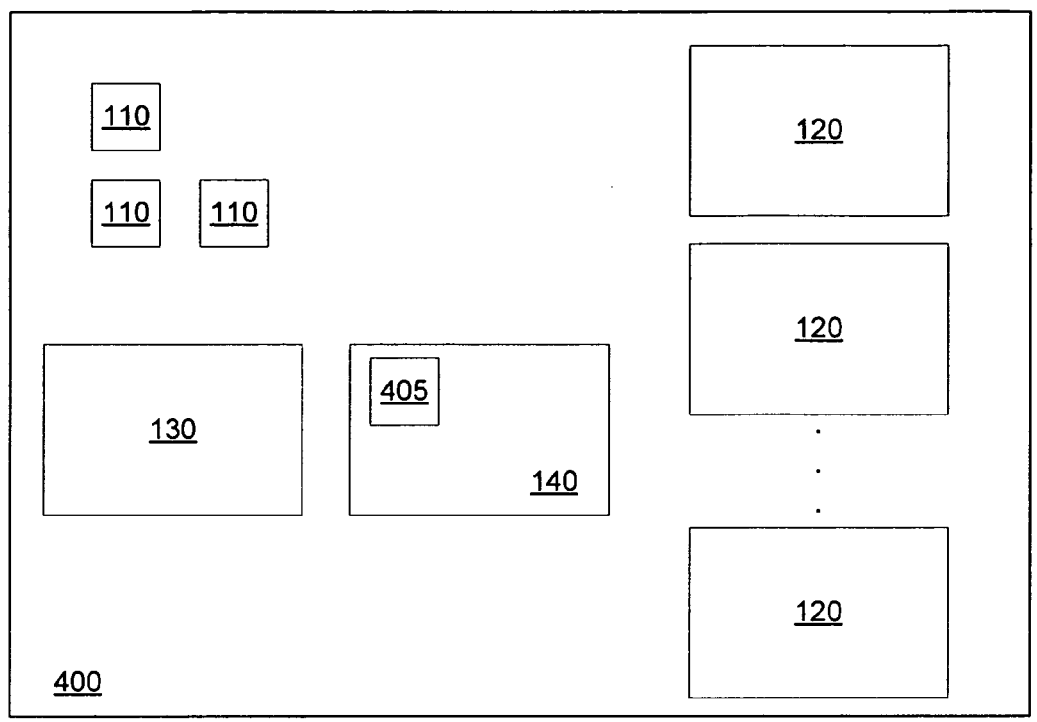
FIG. 4C depicts the web site of FIG. 4B after the container item is again deleted.

In an embodiment, a container item is treated as one item in the second stage recycle bin 140 regardless of the number of items dependent on the container item. Referring again to FIG. 4B, in an embodiment, if the library 405 is deleted from the user recycle bin 120, the library 405 and each of its dependent files 410, 415 and 420 are deleted from the user recycle bin 120 and the first stage recycle bin 130 to the second stage recycle bin 140. In an embodiment, as shown in FIG. 4C, upon this second stage delete only the deleted library item 405 is indicated in the second stage recycle bin 140.

In an alternative embodiment, when the user deletes the library 405 from the user recycle bin 120, library item 405 and each of its dependent file items 410, 415 and 420 are shown in the second stage recycle bin 140. In an embodiment however, none of the dependent files 410, 415 or 420 can be restored to the web site 400 apart from their container library item 405. In this aspect, files 410, 415 and 420 can only be restored to the web site 400 when and if their container library item 405 is restored to the web site 400. Additionally, in this aspect none of the dependent files 410, 415 or 420 can be permanently deleted from the second stage recycle bin 140 apart from their container library item 405. In this aspect, files 410, 415 and 420 will only be permanently deleted when and if their container library item 405 is permanently deleted.

In another embodiment, items dependent on a container item are treated separately from the container item. In this embodiment, when a container item is deleted from a user recycle bin 120 or the first stage recycle bin 130 to the second stage recycle bin 140, each of its dependent items remain in the user recycle bin 120 and the first stage recycle bin 130. Thus, referring to FIG. 4B, in this embodiment, if container library item 405 is deleted from the user recycle bin 120 to the second stage recycle bin 140, each of its dependent file items 410, 415 and 420 will remain in the user recycle bin 120 and the first stage recycle bin 130. Each of the files 410, 415 and 420 can be individually, or in any combination, restored to the web site 400 from the user recycle bin 120 or the first stage recycle bin 130. Each of the files 410, 415 and 420 can also be individually, or in any combination, deleted from the user recycle bin 120 or the first stage recycle bin 130 to the second stage recycle bin 140.

Figure 4D:
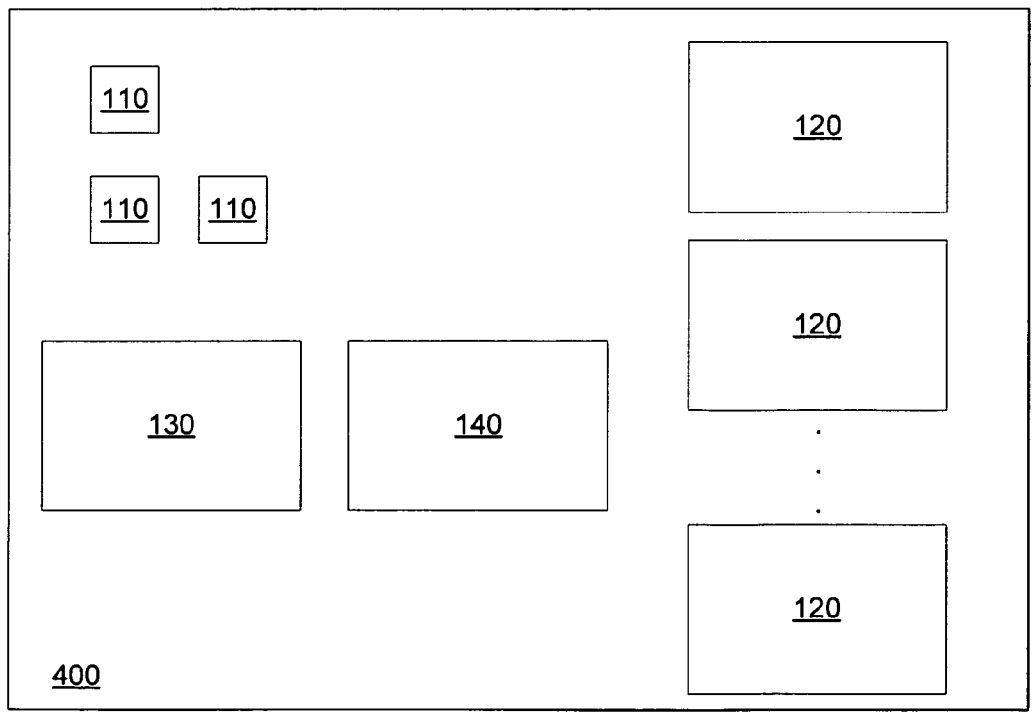
FIG. 4D depicts the web site of FIG. 4C after the container item is permanently deleted from the web site.

Referring to FIG. 4D, in an embodiment, if a web site administrator deletes the library 405 from the second stage recycle bin 140, the library 405 and each of its dependent files 410, 415 and 420 are removed from the second stage recycle bin 140 and permanently deleted from the web site 400. In an embodiment, when the library 405 and its dependent files 410, 415 and 420 are permanently deleted from the web site 400 they can only be restored to the web site 400 by a database restore, an action for restoring a past backup of a web site, or some other similar-resulting operation.

In an embodiment, when a web site user restores a deleted container item from a user recycle bin 120 to a web site or a web site administrator restores a deleted container item from the first stage recycle bin 130 to the web site, all of the container item's dependent items are also restored to the web site. Referring again to FIG. 4B, if a user restores the deleted library 405 from the user recycle bin 120 to the web site 400, the library 405 and all of its dependent files 410, 415 and 420 are removed from the user recycle bin 120 and the first stage recycle bin 130. As shown in FIG. 4A, once the library 405 is restored to the web site 400 it is a live item again, displayed on the web site user interface and accessible by users of the web site 400. The restoration of the library 405 also results in the restoration of all of its dependent files 410, 415 and 420 so that each of these dependent files 410, 415 and 420 are also once more accessible by users of the web site 400.

In an embodiment, when a web site administrator restores a deleted container item from the second stage recycle bin 140 to a web site, all of the container item's dependent items are also restored to the web site. If a web site administrator restores the deleted library 405 from the second stage recycle bin 140 shown in FIG. 4D to the web site 400, the library 405 and all of its dependent files 410, 415 and 420 are removed from the second stage recycle bin 140. Referring again to FIG. 4A, once the library 405 is restored from the second stage recycle bin 140 to the web site 400 it is once more a live item displayed on the web site user interface and accessible by users of the web site 400. The restoration of the library 405 from the second stage recycle bin 140 to the web site 400 also results in the restoration of all of its dependent files 410, 415 and 420 so that each of these dependent files 410, 415 and 420 are also once more accessible by users of the web site 400.

As previously discussed, in an embodiment, when an item is deleted from a web site to a user recycle bin 120 and the first stage recycle bin 130, a record is established for the deleted item in a recycle bin table and associated with the respective user recycle bin 120 and the first stage recycle bin 130. In an embodiment, when an item is deleted from a user recycle bin 120 and/or the first stage recycle bin 130 to the second stage recycle bin 140, the previously established record in the recycle bin table for the deleted item is disassociated with the respective user recycle bin 120 and the first stage recycle bin 130 and associated with the second stage recycle bin 140.

In an embodiment, the user recycle bins 120, the first stage recycle bin 130 and the second stage recycle bin 140 are all different views of a recycle bin table. In an embodiment, the recycle bin table keeps track of the items that have been deleted into any respective recycle bin 120, 130 or 140 via various table entries. Each web site user and the administrator(s) who have access to a recycle bin on a web site are presented with a view of the recycle bin table that includes the items in the specific recycle bin 120, 130 or 140 accessed by the respective user and/or administrator.

In an alternative embodiment, a recycle bin table is established for each user recycle bin 120, a recycle bin table is established for the first stage recycle bin 130 and a recycle bin table is established for the second stage recycle bin 140. In yet another alternative embodiment, a first recycle bin table is established for all the user recycle bins 120, a second recycle bin table is established for the first stage recycle bin 130 and a third recycle bin table is established for the second stage recycle bin 140. In still other alternative embodiments, other combinations of tables and other forms of keeping track of items in various recycle bins are employed.

Figure 5:
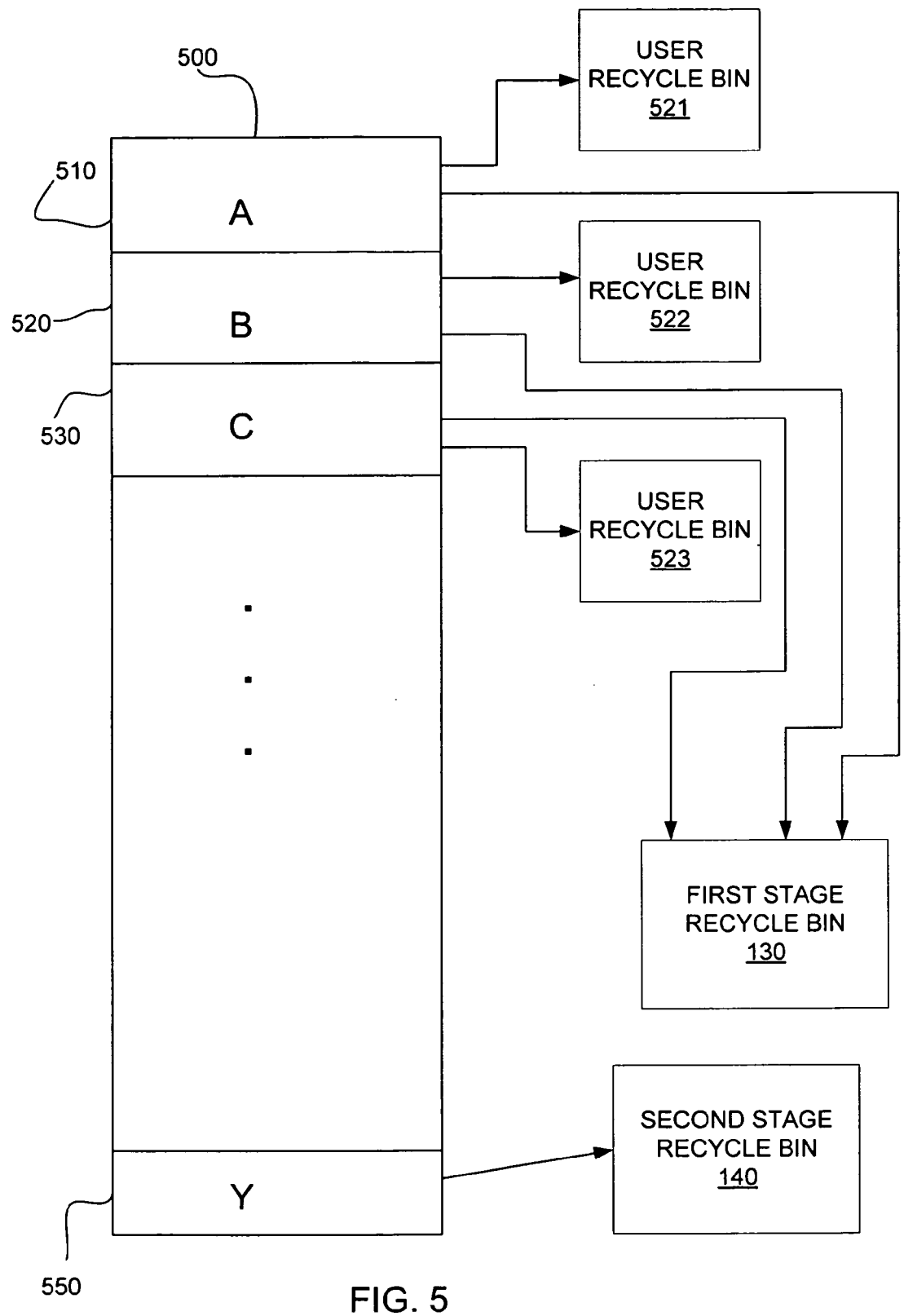
FIG. 5 depicts an exemplary recycle bin table.

In an embodiment as shown in FIG. 5, a recycle bin table 500 has a record of one or more table entries for each item in any user recycle bin 120. In the recycle bin table 500, group A 510 is one or more records of one or more table entries for a user recycle bin 521 for a web site user A, group B 520 is one or more records of one or more table entries for a user recycle bin 522 for a web site user B, group C 530 is one or more records of one or more table entries for a user recycle bin 523 for a web site user C, and so on. The recycle bin table 500 has a group of one or more records for each user recycle bin supported on a web site that has one or more items deleted into it.

In an embodiment, the same group of records A 510, B 520, C 530, etc. are also associated with the first stage recycle bin 130. The first stage recycle bin 130 has all the items deleted into each user recycle bin, e.g., user recycle bin 521, user recycle bin 522, user recycle bin 523, etc., and thus, the same records used to indicate the deleted items in the user recycle bins 521, 522, 523, etc. indicate the items deleted to the first stage recycle bin 130.

In an embodiment, more information for a deleted item is displayed in the user interface for the first stage recycle bin than is displayed in the user interface for a user recycle bin, as further discussed below. The record for each deleted item in the recycle bin table 500 in group A 510, group B 520, group C 530, etc. has, or otherwise refers to, the information about the deleted item displayed in the user interface for the user recycle bins as well as the information about the deleted item displayed in the user interface for the first stage recycle bin.

In an embodiment, the recycle bin table 500 has a group Y 550 of one or more records of one or more table entries for the second stage recycle bin 140. In an embodiment, the records of group Y 550 are previous records of groups A 510, B 520, C 530, etc. When an item is deleted from a user recycle bin, e.g., user recycle bin 521, 522 or 523, and/or the first stage recycle bin 130 to the second stage recycle bin 140, the record previously associated with one of groups A 510, B 520, C 530, etc. is re-associated with group Y 550.

In an embodiment, the same information for a deleted item is displayed in the user interface for the second stage recycle bin 140 as is displayed in the user interface for the first stage recycle bin 130. Each record in the recycle bin table 500 in any group A 510, B, 520, C 530, etc. and group Y 550 contains, or otherwise refers to, the information about the respective deleted item displayed in the user interface for the user recycle bins, e.g., user interface for any of the user recycle bins 521, 522 or 523. Each record in the recycle bin table 500 in any group A 510, B, 520, C 530, etc. and group Y 550 also contains, or otherwise refers to, the information about the respective deleted item displayed in the user interface for the first stage recycle bin 130 and displayed in the user interface for the second stage recycle bin 140.

In an alternative embodiment, when an item is deleted from a user recycle bin, e.g., user recycle bin 521, 522 or 523, to the second stage recycle bin 140, the record for the item in one of groups A 510, B 520, C 530, etc. is deleted or otherwise disassociated with the recycle bin table 500 and a new record is established for the deleted item in group Y 550. Likewise, in this alternative embodiment, when an item is deleted from the first stage recycle bin 130 to the second stage recycle bin 140, the record for the item in one of groups A 510, B 520, C 530, etc. is deleted or otherwise disassociated with the recycle bin table 500 and a new record is established for the deleted item in group Y 550.

When an item is restored from a user recycle bin, e.g., user recycle bin 521, 522 or 523, and/or the first stage recycle bin 130 to the web site, the record for the item in group A 510, B 520, C, 530, etc. of the recycle bin table 500 is deleted or otherwise disassociated from the recycle bin table 500. When the user interface for the user recycle bin or the user interface for the first stage recycle bin 130 is subsequently displayed, the item restored to the web site is no longer in the user recycle bin, e.g., user recycle bin 521, 522 or 523, or the first stage recycle bin 130.

When an item is deleted from the second stage recycle bin 140 or restored from the second stage recycle bin 140 to the web site, the record for the item in the group Y 550 of the recycle bin table 500 is deleted or otherwise disassociated from the recycle bin table 500. When the user interface for the second stage recycle bin 140 is subsequently displayed, the item deleted or restored from the second stage recycle bin 140 is no longer in the recycle bin 140.

Although shown as physically contiguous in FIG. 5 for ease of explanation, the records in the recycle bin table 500 for any particular group A 510, B 520, C 530, etc. and group Y 550 need not be physically contiguous. For example, in an embodiment, a record is established in the recycle bin table for an item deleted from a web site to a user recycle bin 120. The record indicates, or is otherwise associated with, the user that deleted the item from the web site. The record also contains a delete field, or flag, that indicates the item is in a first stage delete, i.e., it has been deleted to a user recycle bin 120 and the first stage recycle bin 130. In this embodiment, when the item is deleted to the second stage recycle bin 140, the delete field, or flag, in the record for the item in the recycle bin table is updated to indicate the item is now in the second stage delete.

When the user recycle bin 521 for a web site user A is displayed, i.e., the user interface for this user recycle bin 521 is shown to the web site user A, the items identified by the records in group A 510 of the recycle bin table 500 are displayed. Similarly, when a user recycle bin 522 for a web site user B is displayed, the items identified by the records in group B 520 are displayed. The items identified by the records in group C 530, etc. of the recycle bin table 500 are likewise displayed in the user interface for the respective user recycle bin.

When the user interface for the first stage recycle bin 130 is displayed to the appropriate web site administrator(s), the items identified by the records in groups A 510, B 520, C 530, etc. for the various user recycle bins 521, 522, 523, etc. are displayed.

When the user interface for the second stage recycle bin 140 is displayed to the appropriate web site administrator(s), the items identified by the records in group Y 550 are displayed.

Figure 6:
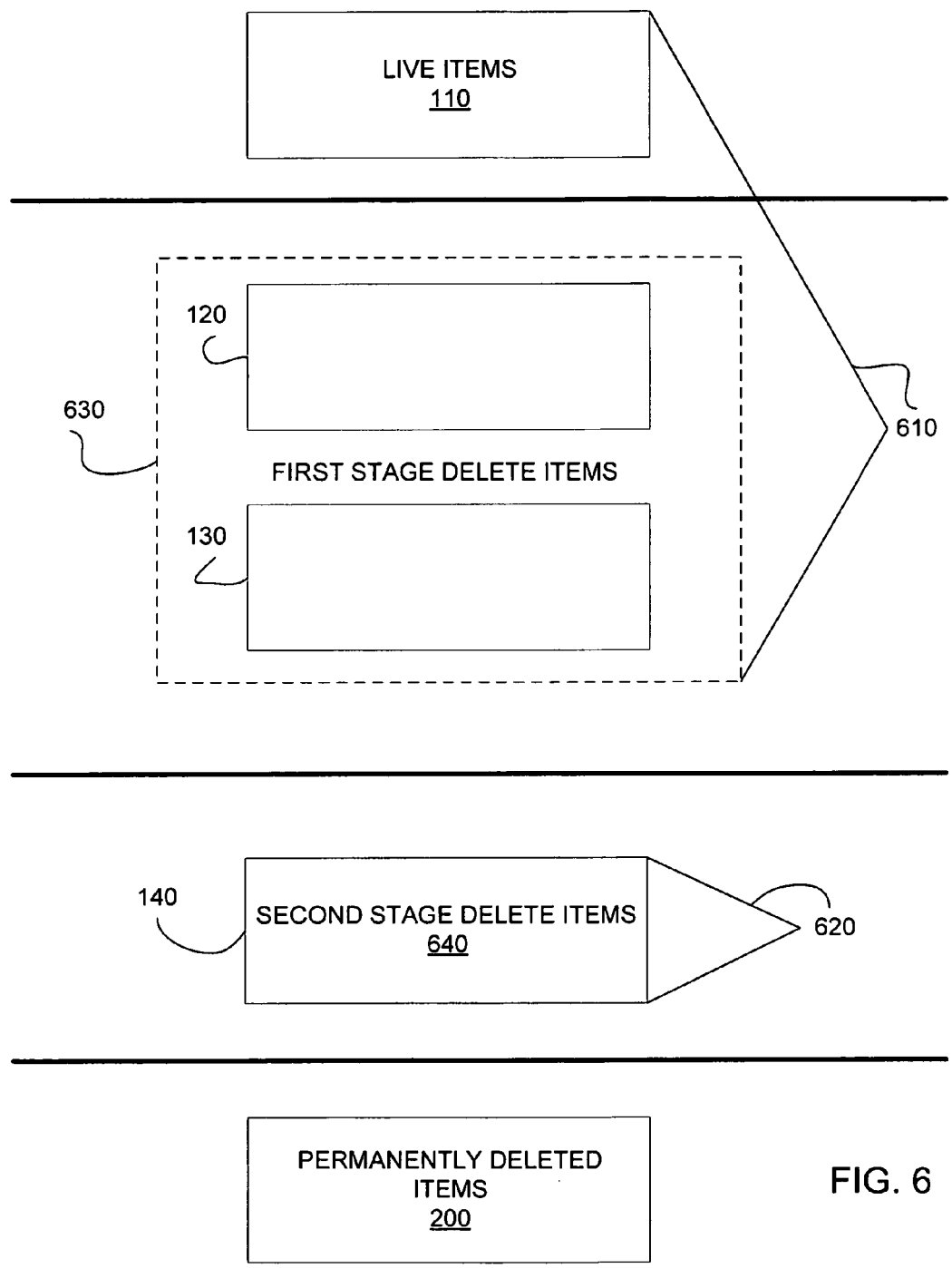
FIG. 6 depicts various stages an item can progress through in an embodiment multi-stage recycle bin scheme.

Referring to FIG. 6, in an embodiment, items deleted to a user recycle bin 120 and the first stage recycle bin 130 are first stage delete items 630, items deleted to the second stage recycle bin 140 are second stage delete items 640 and items deleted from the second stage recycle bin 140 are permanently deleted items 200.

In an embodiment, a web site, e.g., web site 100, has a web site quota that is the amount of disk space or storage allocated for items for the web site 100. When an item 110 is added to the web site 100 the size of the item, i.e., the amount of disk space or storage the item uses in the database, or other storage mechanism, for the web site 100, is added to a site used space amount 610 for the web site 100. In an embodiment, the site used space amount 610 is the amount of disk space or storage used by the live items 110 and the first stage delete items 630 associated with the web site 100. In an embodiment, when a live item 110 is deleted to a user recycle bin 120 and the first stage recycle bin 130 the size of the item remains included in the site used space amount 610 for the web site 100.

When the site used space amount 610 reaches or exceeds the web site quota for the web site 100 no more items can be added to the web site 100 until the site used space amount 610 is decreased, by, e.g., deleting one or more first stage delete items 630 to the second stage recycle bin 140.

In an embodiment, a web site administrator can set a second stage storage quota for the second stage recycle bin 140 that can be used to help regulate the amount of items in the second stage recycle bin 140. In an embodiment, the second stage storage quota can be set between zero percent and one thousand percent of the web site quota for the web site 100. For example, if the web site 100 has a web site quota of 100 MB, the second stage storage quota can be set between 0 MB and 1000 MB. In an embodiment, the default second stage storage quota is fifty percent. In our previous example, with a web site quota of 100 MB, the default setting would establish a second stage storage quota of 50 MB.

In an embodiment, when an item is deleted to the second stage recycle bin 140, the size of the item, i.e., the amount of disk space or storage the item uses in the database, or other storage mechanism, for the web site 100, is subtracted from the site used space amount 610 and added to a second stage used amount 620. The second stage used amount 620 is the amount of disk space, or other storage, used by the second stage delete items 640.

When the item is subsequently deleted from the second stage recycle bin 140, the size of the item is subtracted from the second stage used amount 620. Permanently deleted items 200, as they are no longer associated with the web site 100, are not used in determining the site used space amount 610 or the second stage used amount 620.

If an item is restored from the second stage recycle bin 140 to the web site 100, the size of the item is subtracted from the second stage used amount 620 and added back to the site used space amount 610.

When the second stage used amount 620 reaches or exceeds the second stage storage quota established for the second stage recycle bin 140, the second stage recycle bin 140 is full. In an embodiment, when an item is deleted to a full second stage recycle bin 140, items are deleted from the second stage recycle bin 140 in an attempt to make room for the new item.

Figure 7A:
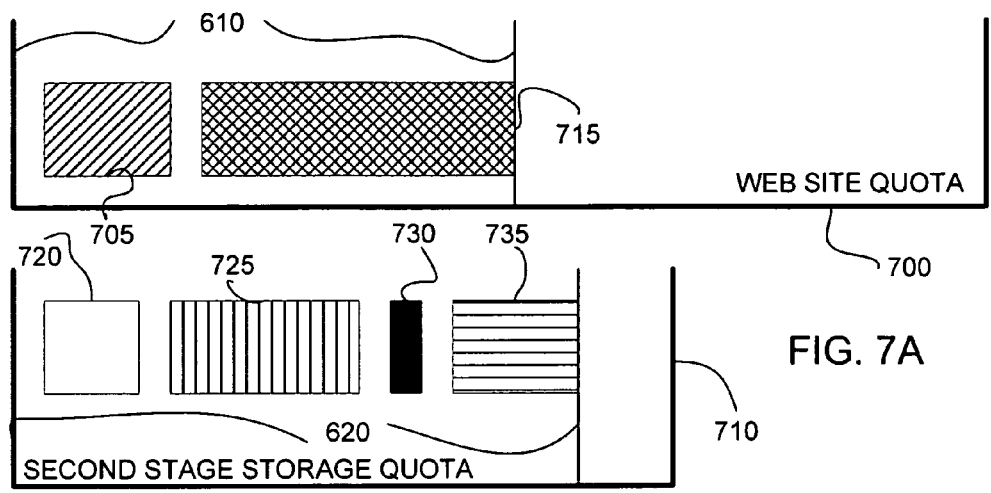
FIGS. 7A, 7B and 7C depict exemplary items associated with a web site in which an item in a user recycle bin is deleted.

As an example of this embodiment, referring to FIG. 7A, item 705 is a live item 110 on an exemplary web site 100 and item 715 is deleted to a user recycle bin 120. Both item 705 and item 715 are used in determining the site used space amount 610 for the web site 100. In this example, the site used space amount 610 is less than the web site quota 700 for the web site 100, and thus the web site 100 can accommodate more items.

In FIG. 7A, items 720, 725, 730 and 735 are second stage delete items 640, i.e., items deleted to the second stage recycle bin 140. Items 720, 725, 730 and 735 are used in determining the second stage used amount 620 for the second stage recycle bin 140. In this example, the second stage used amount 620 is close to equaling the second stage storage quota 710, and thus the second stage recycle bin 140 is near full.

Figure 7B:
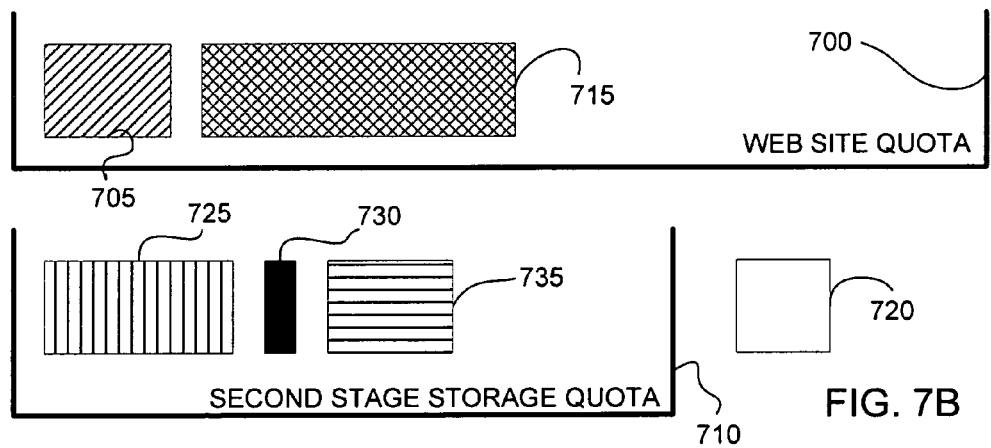

When a user attempts to delete item 715 from their user recycle bin 120, item 715 will not fit in the second stage recycle bin 140 as its size is larger than the difference between the second stage storage quota 710 and the second stage used amount 620. In an embodiment, items starting with the oldest are deleted from the second stage recycle bin 140 to attempt to make room for the newly deleted item 715. In an embodiment, the oldest item in the second stage recycle bin 140 is the second stage delete item 640 that was the first of the second stage delete items 640 to be deleted to a user recycle bin 120 and the first stage recycle bin 130. In this example, item 720 is the oldest, and as shown in FIG. 7B, it is the first second stage delete item 640 permanently deleted from the second stage recycle bin 140 as the system attempts to make room for item 715.

Figure 7C:
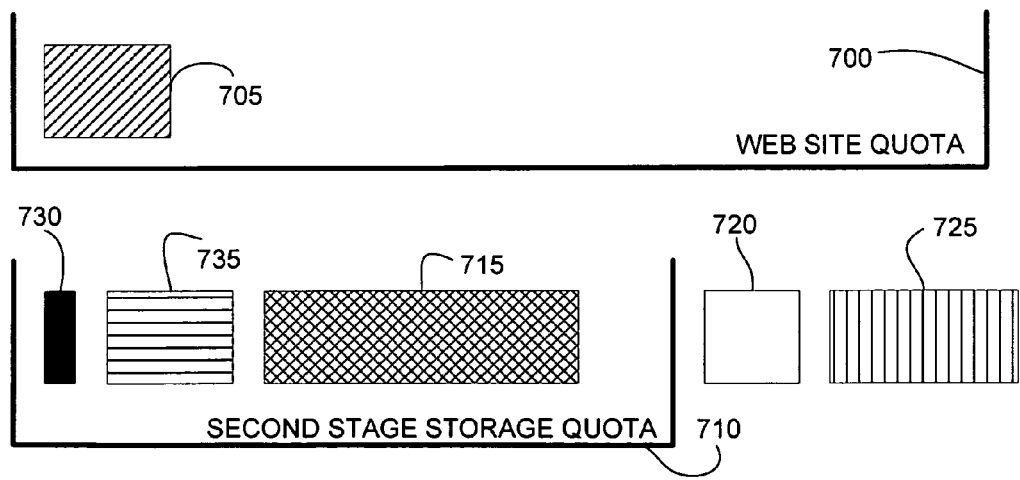

After the permanent delete of item 720, item 715 still does not fit in the second stage recycle bin 140. Thus, once again the oldest item in the second stage recycle bin 140, this time item 725, is permanently deleted from the second stage recycle bin 140 as the system attempts to make room for item 715. As shown in FIG. 7C, after item 725 is permanently deleted, item 715 fits into and is thus deleted into the second stage recycle bin 140.

In an alternative embodiment, if a first stage delete item 630 is deleted from a user recycle bin 120 to a full second stage recycle bin 140, the delete is blocked and the item 630 remains in the user recycle bin 120. In this alternative embodiment, when the second stage recycle bin 140 is full, items are blocked from being deleted into it until an appropriate web site administrator empties, e.g., deletes from the second stage recycle bin 140 or restores from the second stage recycle bin 140 to the web site, one or more second stage delete items 640. In an aspect of this alternative embodiment, when a user attempts to delete an item from their user recycle bin 120 and the second stage recycle bin 140 is full, the user is given an error message indicating the deletion was blocked.

In a feature of this alternative embodiment, a web site administrator is given one or more alerts once the second stage used amount 620 exceeds a predetermined capacity, e.g., once the second stage used amount 620 exceeds seventy-five percent of the second stage storage quota 710. In another feature of this alternative embodiment, the one or more alerts inform the web site administrator that one or more items should be removed from the second stage recycle bin 140, e.g., permanently deleted from it or restored from it to the web site, to ensure that users can continue to delete items from the user recycle bins 120.

In an embodiment, if a first stage delete item 630 is deleted to the second stage recycle bin 140 but its size is larger than the second stage storage quota 710, the first stage delete item 630 is permanently deleted. Referring to FIG. 8A, the size of item 810, an exemplary item deleted to a user recycle bin 120, is larger than the second stage storage quota 710 for the second stage recycle bin 140. When a user deletes item 810 from their user recycle bin 120, as shown in FIG. 8B, the item is not deleted to the second stage recycle bin 140, but rather is permanently deleted. After this, item 810 can only be restored to the web site by a database restoration, an action for restoring a past backup of a web site, or some other similar-resulting action.

In an alternative embodiment, a web site has a web site quota 700 that is the amount of disk space or storage allocated for items for the web site 100 and a recycle bin quota that is the amount of disk space or storage that can be used to accommodate the items deleted to any user recycle bin 120, the first stage recycle bin 130 and the second stage recycle bin 140. In this alternative embodiment, the site used space amount is the amount of disk space, or other storage, used by live items on the web site, and a recycle bin used amount is the amount of disk space, or other storage, used by items deleted to any user recycle bin 120, the first stage recycle bin 130 and the second stage recycle bin 140. When an item is deleted from a web site to a user recycle bin 120 its size is subtracted from the site used space amount and added to the recycle bin used amount. If the item is subsequently permanently deleted its size is subtracted from the recycle bin used amount. Alternatively, if the item is subsequently restored to the web site from any recycle bin 120, 130 or 140 its size is subtracted from the recycle bin used amount and added back to the site used space amount.

In this alternative embodiment, a web site administrator can set the recycle bin quota to help regulate the amount of items in all the recycle bins 120, 130 and 140.

In an embodiment, a web site administrator can set an automatic cleanup timer that causes the system to automatically permanently delete items deleted to a user recycle bin 120, the first stage recycle bin 130 and the second stage recycle bin 140 after a specified time. If the automatic cleanup timer is set and an item has been deleted to a user recycle bin 120 for longer than the time specified by the automatic cleanup timer, the item is automatically permanently deleted, by-passing the second stage recycle bin 140. If the automatic cleanup timer is set and an item in the second stage recycle bin 140 was deleted to a user recycle bin 120 and the first stage recycle bin 130 earlier than the time specified by the automatic cleanup timer, the item is also automatically permanently deleted.

In an embodiment, the automatic cleanup timer is set to the number of days an item can remain deleted in any of the user recycle bins 120, the first stage recycle bin 130 and/or the second stage recycle bin 140 prior to being automatically permanently deleted. In an embodiment, the automatic cleanup timer has a default setting of thirty (30) days. With this default setting established, any item that is deleted to a user recycle bin 120 and the first stage recycle bin 130 thirty (30) days or longer is automatically permanently deleted. With this default setting, any item in the second stage recycle bin 140 that was initially deleted to a user recycle bin 120 thirty (30) or more days prior will also be automatically permanently deleted.

In an embodiment, if the automatic cleanup timer is set, by default the automatic cleanup timer service is scheduled to run at a specified time of the day, every day. In an embodiment, a web site administrator can customize the automatic cleanup timer service to run at an alternative time, and/or more or less often, e.g., once every six hours, or once a week.

In an embodiment, a web site administrator can disable the automatic cleanup timer so that no items are automatically permanently deleted from any recycle bin 120, 130 or 140.

In an alternative embodiment, the automatic cleanup service can be initiated based on an event rather than a time. In one aspect of this alternative embodiment, the automatic cleanup service can be initiated after the second stage used amount 620 reaches or exceeds a specified percentage of the second stage storage quota 710. For example, in this aspect of the alternative embodiment, the automatic cleanup service can be programmed to initiate after the second stage used amount 620 reaches seventy-five (75) percent of the second stage storage quota 710.

In other alternative embodiments, the automatic cleanup service can be initiated based on other measurable events, e.g., but not limited to, when the site used space amount 610 reaches or exceeds a specified percentage of the web site quota 700, or when the combination of the site used space amount 610 and the second stage used amount 620 reaches or exceeds a specified percentage of the web site quota 700

FIGS. 9A, 9B, 9C and 9D illustrate an embodiment logic flow for a methodology for multi-stage recycle bin maintenance for a web site. While the following discussion is made with respect to systems described herein, the operations described may be implemented in other systems. Further, the operations described herein are not limited to the order shown. Additionally, in other alternative embodiments more or fewer operations may be performed.

Figure 9A:
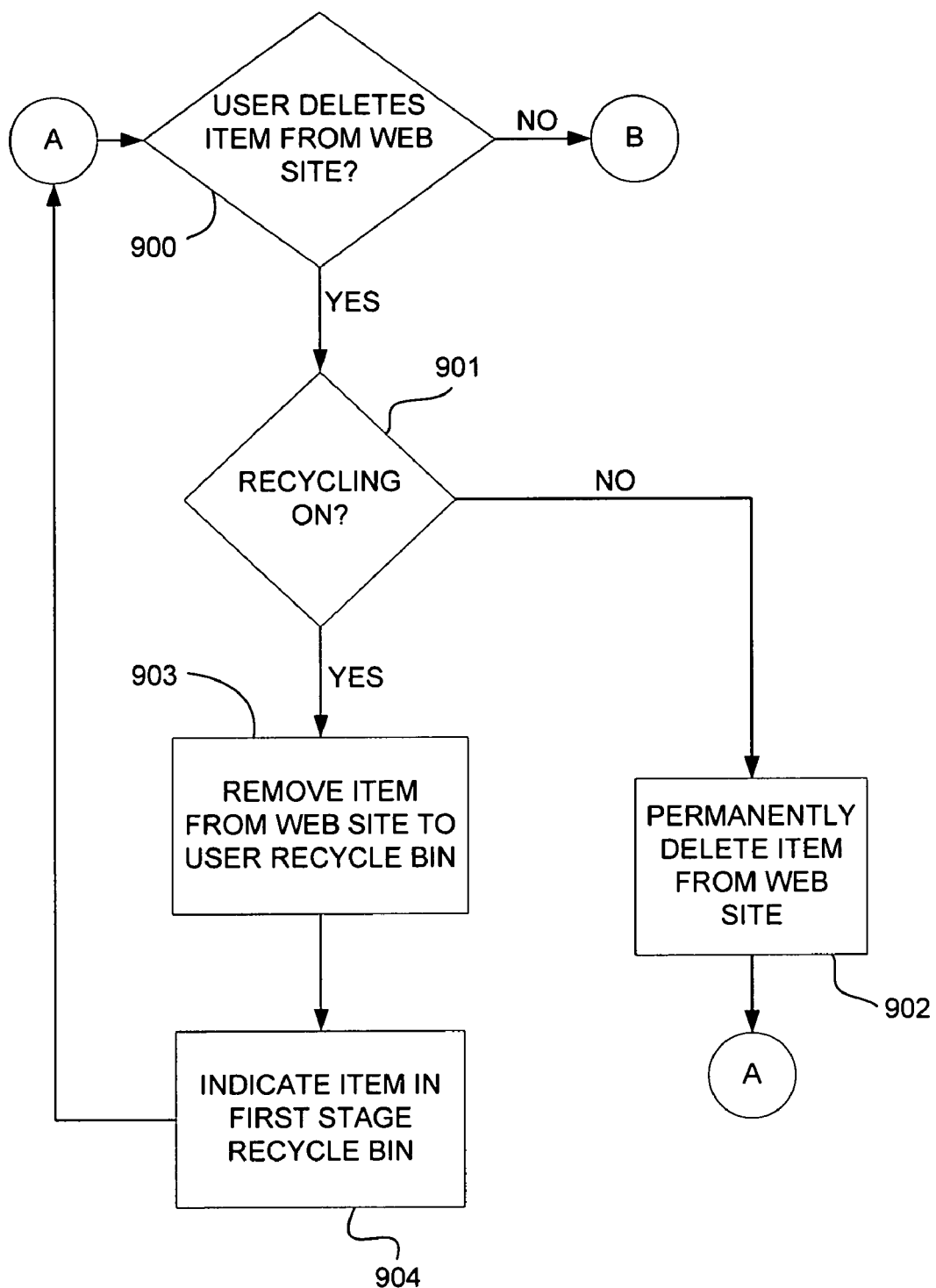
FIGS. 9A, 9B, 9C and 9D illustrate an embodiment of a logic flow for multi-stage recycle bin maintenance on a web site.

In FIG. 9A, at decision block 900 a determination is made as to whether a user has deleted an item from a web site. If yes, a determination is made at decision block 901 as to whether recycling is currently enabled, i.e., whether recycle bins are currently enabled for the web site. In an embodiment, one or more web site administrators have the ability to enable or disable all the recycle bins, i.e., all the user recycle bins, the first stage recycle bin and the second stage recycle bin, for the web site.

If recycling is not currently enabled for the web site, the item the user deleted from the web site is permanently deleted 902. The deleted item can then only be restored to the web site via a database restore, an action for restoring a past backup of a web site, or some other similar-resulting operation.

If, alternatively, recycling is currently enabled for the web site, the item the user deleted is removed from the web site to the user's user recycle bin 903. The item is also now indicated in the first stage recycle bin 904. In this manner the item is deleted from the web site to the appropriate user recycle bin and to the first stage recycle bin.

Figure 9B:
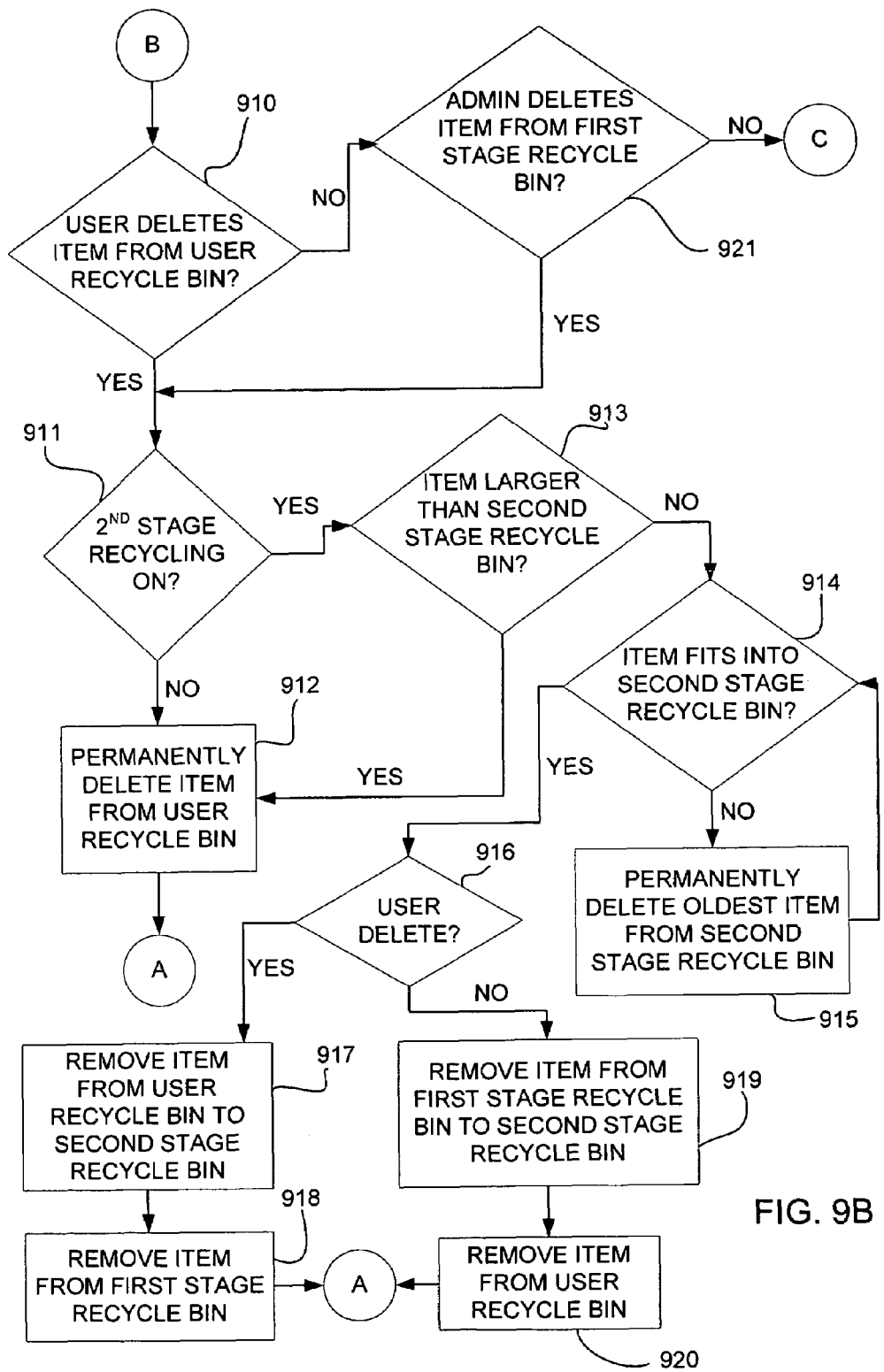

Referring to FIG. 9B, at decision block 910 a determination is made as to whether a user has deleted an item from their user recycle bin. If yes, a determination is made at decision block 911 as to whether second stage recycling is currently enabled, i.e., whether the second stage recycle bin is currently enabled for the web site. In an embodiment, one or more web site administrators have the ability to enable or disable the second stage recycle bin for the web site.

If second stage recycling is not currently enabled for the web site the item the user deleted from their user recycle bin is permanently deleted 912. Alternatively, if second stage recycling is enabled for the web site, at decision block 913 a determination is made as to whether the currently deleted item is larger than the second stage recycle bin, i.e., whether the size of the currently deleted item is larger than the second stage storage quota for the second stage recycle bin. If yes, the item does not fit into the second stage recycle bin so it is permanently deleted from the user recycle bin and from the web site 912.

If, alternatively, the currently deleted item is not larger than the second stage recycle bin, at decision block 914 a determination is made as to whether the item fits into the second stage recycle bin, i.e., whether the addition of the size of the item to the second stage used amount will cause the second stage used amount to exceed the second stage storage quota. If the item fits into the second stage recycle bin, and it is determined 916 that this is a user delete, the item is removed from the user recycle bin to the second stage recycle bin 917. The item is also removed from the first stage recycle bin 918. In this manner the item is deleted from the user recycle bin and the first stage recycle bin to the second stage recycle bin.

If the item does not currently fit into the second stage recycle bin the oldest item in the second stage recycle bin is permanently deleted from the second stage recycle bin and the web site 915. In an embodiment, the oldest item in the second stage recycle bin is the item in the second stage recycle bin that was the first to be deleted to a user recycle bin. Once the oldest item is permanently deleted from the second stage recycle bin 915, a determination is once more made at decision block 914 as to whether the item currently deleted from the user recycle bin will fit into the second stage recycle bin. If no, the now currently oldest item in the second stage recycle bin is permanently deleted from the second stage recycle bin and the web site 915. The loop consisting of the decision block 914 and the delete block 915 continue to be executed until there is room in the second stage recycle bin for the item currently deleted from a user recycle bin. Once there is room, and it is determined 916 that this is a user delete, the item is removed from the user recycle bin to the second stage recycle bin 917 and is also removed from the first stage recycle bin 918.

At decision block 921 a determination is made as to whether a web site administrator has deleted an item from the first stage recycle bin. If yes, the logic is similar to that of the user delete of an item from a user recycle bin. At decision block 916, a determination is made as to whether it is a user delete, and as it is not, the item is removed from the first stage recycle bin to the second stage recycle bin 919, and the item is also removed from the respective user recycle bin 920.

Figure 9C:
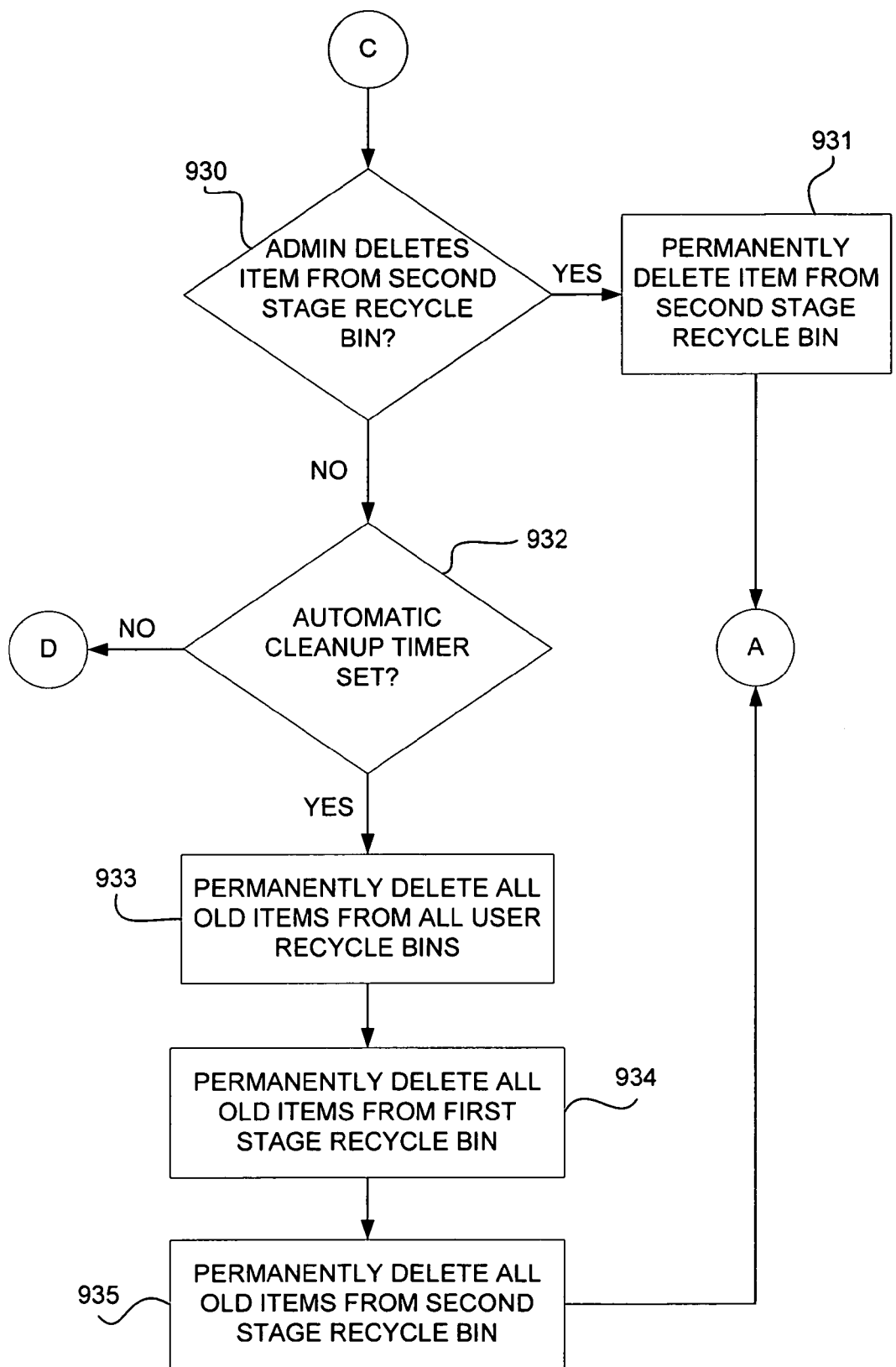

In FIG. 9C, at decision block 930 a determination is made as to whether a web site administrator has deleted an item from the second stage recycle bin. If yes, the item is permanently deleted from the second stage recycle bin and the web site 931.

At decision block 932 a determination is made as to whether the automatic cleanup timer is set. If the automatic cleanup timer has been set, when the cleanup timer service is scheduled to run all items that have been in any user recycle bin longer than the set time are permanently deleted from the respective user recycle bins and the web site 933. Likewise, if the automatic cleanup timer has been set, when the cleanup timer service is scheduled to run all items that have been in the first stage recycle bin longer than the set time are permanently deleted from the first stage recycle bin and the web site 934. And, if the automatic cleanup timer has been set, when the cleanup timer service is scheduled to run all items in the second stage recycle bin that have been deleted to any recycle bin from the web site longer than the set time are permanently deleted from the second stage recycle bin and the web site 935.

Figure 9D:
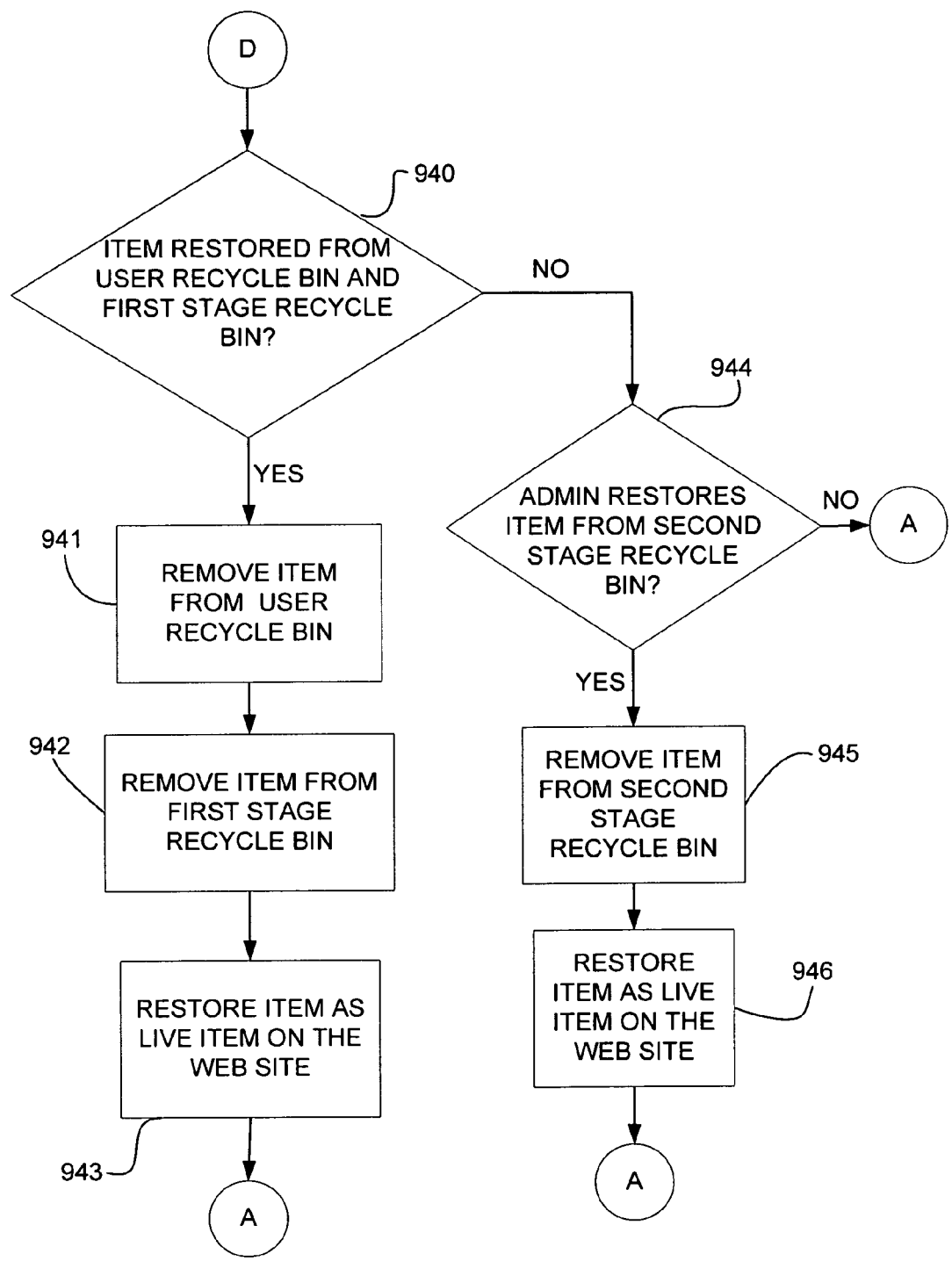

Referring to FIG. 9D, at decision block 940 a determination is made as to whether an item previously deleted to a user recycle bin and the first stage recycle bin is being restored by a user or web site administrator. If yes, the restored item is removed from the user recycle bin 941. The restored item is also removed from the first stage recycle bin 942. The item is restored as a live item on the web site, once again displayed on the web site user interface and accessible to users of the web site 943.

At decision block 944 a determination is made as to whether a web site administrator has restored an item previously deleted to the second stage recycle bin. If yes, the restored item is removed from the second stage recycle bin 945. The item is restored as a live item on the web site, once again displayed on the web site user interface and accessible to users of the web site 946.

In an embodiment, a user interface is established for each user recycle bin 120 for a web site. The user interface for a user recycle bin 120 displays information about the items the user has deleted from the web site. FIG. 10 is an exemplary embodiment of a user interface for a user recycle bin 120, i.e., user recycle bin interface 1000.

In an embodiment, a user recycle bin interface 1000 contains a description 1015. In an embodiment, the description 1015 indicates that the user recycle bin interface 1000 can be used to delete items from the respective user recycle bin 120 or to restore items from the user recycle bin 120 to the web site. In an embodiment, if the automatic cleanup timer is enabled the description 1015 also indicates the time that items can remain in the user recycle bin 120 prior to being automatically permanently deleted.

In an embodiment, a user recycle bin interface 1000 contains a record 1005 of several fields of information for each item in the user recycle bin 120. In an embodiment, each record 1005 has a checkbox field 1010 containing a checkbox 1035 that the respective user can check to select one or more items in their user recycle bin 120. Once a checkbox 1035 is checked, e.g., the user clicks on the appropriate checkbox 1035, the user can then either restore 1020 the selected item to the web site or delete 1030 the selected item from the user recycle bin 120. In an embodiment, the user can check, i.e., select, one or more items in the user recycle bin 120 at a time and then perform a restore 1020 or a delete 1030 action on all the selected items together.

In an embodiment, the user can unselect a selected item in the user recycle bin 120 by, e.g., re-clicking on the appropriate checkbox 1035 that was previously checked.

In an embodiment, the user recycle bin interface 1000 has a checkbox 1025 for the entire checkbox field 1010. In an embodiment, if the user checks, i.e., selects, the checkbox 1025 all the items in the user recycle bin 120 are selected. In an embodiment, the user can unselect all selected items in the user recycle bin 120 by, e.g., re-clicking on the checkbox 1025 after it has been previously checked.

In an embodiment, the user recycle bin interface 1000 has a type field 1040 that contains an icon identifying the respective item type. For example, if the associated deleted item is a file the icon identifies the file extension. In an embodiment, where there is no known icon for the respective item a generic file icon is displayed in the item's type field 1040.

In an embodiment, the user recycle bin interface 1000 has a name field 1050 that identifies the name of the item in the user recycle bin 120. In an embodiment, the user cannot select, e.g., click on, the name field 1050 as items cannot be opened or otherwise accessed from a user recycle bin 120.

In an embodiment, a user can delete different historical versions of the same file from a web site. The name field 1050 for a file with two or more versions in the user recycle bin 120 indicates the respective version of the file as well as the file's name.

In an embodiment, the user recycle bin interface 1000 has an original location field 1060 that contains the URL of the original folder, library or list the item resided in on the web site before it was deleted to the user recycle bin 120. The user can select, e.g., click on, the original location field 1060 for an item to view its web site location. In an embodiment, if the original location for a deleted item no longer exists the user is given an error message, e.g., a "page not found" error message.

In an embodiment, the user recycle bin interface 1000 has a created by field 1070 that provides the name of the original author of the deleted item. In an embodiment, the created by field 1070 is presence enabled so that the user can see if the original author of an item is logged onto the web site and is available for, e.g., instant messaging.

In an embodiment, the user recycle bin interface 1000 has a deleted field 1080 that provides the date and time the item was deleted from the web site to the user recycle bin 120. In an embodiment, as a default the items identified in the user recycle bin interface 1000 are shown in descending order pursuant to the values in the deleted field 1080. In this manner, the items most recently deleted from the web site to the user recycle bin 120 are shown at the top of the page of the user recycle bin interface 1000.

In an embodiment, users can reorder the items in their user recycle bin 120 by clicking the column header 1085 for the deleted field 1080. If a user clicks the column header 1085 when the default descending order is enabled, the items shown in the user recycle bin 120 will be reordered in ascending order, i.e., the oldest items deleted from the web site to the user recycle bin 120 will be shown at the top of the page of the user recycle bin interface 1000. If the user re-clicks the column header 1085, the items will once more be reordered in descending order.

In an embodiment, the user recycle bin interface 1000 has a file size field 1090 that provides the size of the deleted item. For example, if the deleted item is a file its file size field 1090 identifies the file's size in kilobytes. As another example, if the deleted item is a library its file size field 1090 identifies the combined size, in kilobytes, of all the items in the library at the time the library was deleted from the web site to the user recycle bin 120.

In an embodiment, a maximum number of records per page are displayed in the user interface for a user recycle bin 120. In an embodiment, the maximum number of records per page of a user interface for a user recycle bin 120 is fifty (50). When a fifty-first item is deleted to a user recycle bin 120 automatic paging is enabled. The fifty most recently deleted items are shown in a first page of the user recycle bin interface 1000 and the oldest deleted item is shown on a second page of the user recycle bin interface 1000.

In an embodiment, selecting the checkbox 1025 on a page of the user recycle bin interface 1000 causes all the items on that page to be selected, but no items on any other page are selected. Likewise, unselecting the checkbox 1025 on a page of the user recycle bin interface 1000 causes all the items on that page that were previously selected to be unselected, but no items on any other page are affected. A restore 1020 or delete 1030 of multi-items can only be performed on multi-items on a single page of the user recycle bin interface 1000 at a time.

In an embodiment, a user interface is established for the first stage recycle bin 130 and for the second stage recycle bin 140. The user interface for each of the recycle bins 130 and 140 displays to the appropriate web site administrator(s) information about the items in these respective recycle bins 130 and 140. FIG. 11 is an exemplary embodiment of a user interface for the first stage recycle bin 130 and the second stage recycle bin 140, i.e., site collection recycle bin interface 1100.

In an embodiment, the site collection recycle bin interface 1100 has a select view option 1140 that allows a web site administrator to select the first stage recycle bin 1120 or to select the second stage recycle bin 1130. The deleted items in the selected recycle bin (first stage recycle bin 130 or second stage recycle bin 140) are then displayed in the site collection recycle bin interface 1100.

In an embodiment, the site collection recycle bin interface 1100 contains a description 1115. In an embodiment, the description 1115 indicates that the site collection recycle bin interface 1100 can be used to delete items from the first stage recycle bin 130 or the second stage recycle bin 140, or to restore items from the first stage recycle bin 130 or the second stage recycle bin 140 to the web site. In an embodiment, if the automatic cleanup timer is enabled the description 1115 also indicates the time that items can remain in any of the web site recycle bins 120, 130 or 140 prior to being automatically permanently deleted.

In an embodiment, the site collection recycle bin user interface 1100 contains all the fields of information for each deleted item in the respective recycle bin 130 or 140 that are contained in the user recycle bin interface 1000 for items deleted in a user recycle bin 120. Thus, a record for a deleted item identified in the site collection recycle bin interface 1100 has a checkbox field 1010, a type field 1040, a name field 1050, an original location field 1060, a created by field 1070, a deleted field 1080 and a file size field 1090, all as previously described.

In addition, in an embodiment, the site collection recycle bin user interface 1100 has a deleted by field 1160 that identifies the user that deleted the respective item from the web site. A web site administrator can use this deleted by field 1160 to more quickly locate an item deleted by a specific user that the web site administrator, e.g., intends to restore 1020 to the web site.

In an embodiment, if the site collection recycle bin user interface 1100 is currently displaying items deleted to the first stage recycle bin 130, a web site administrator can empty the first stage recycle bin 1150. If the web site administrator empties the first stage recycle bin 1150, all the items in all the user recycle bins 120, and in the first stage recycle bin 130, are deleted to the second stage recycle bin 140.

In an embodiment, the empty recycle bin option 1150 is not available if the site collection recycle bin user interface 1100 is currently displaying items deleted to the second stage recycle bin 140. Without this empty option 1150 for the second stage recycle bin 140 it is that much less likely a web site administrator will erroneously permanently delete items from the second stage recycle bin 140.

In an alternative embodiment, when a user deletes a live item from a web site, it is deleted to the user's user recycle bin 120 and a web site recycle bin. When the user deletes the same item for the user recycle bin 120, it is removed from the user recycle bin 120, but remains in the web site recycle bin. In this embodiment, the item is permanently deleted from the web site when a web site administrator deletes the item from the web site recycle bin.

In another alternate embodiment, users who have write access ("write access users") to a web site can access a common first stage recycle bin. In this embodiment, when a user deletes a live item from a web site, the item is deleted to a common first stage recycle bin. All write access users can view the common first stage recycle bin, restore items from this common first stage recycle bin to the web site, or delete items from this common first stage recycle bin to a second stage recycle bin 140. In this embodiment, when a user deletes an item from the common first stage recycle bin it is deleted to the second stage recycle bin 140. Users do not have access to the second stage recycle bin 140, but one or more web site administrators can access the second stage recycle bin 140. In this embodiment, an appropriate web site administrator can permanently delete items from the second stage recycle bin 140 or, alternatively, restore items in the second stage recycle bin 140 to the web site.

In yet another alternative embodiment, rather than user recycle bins 120 there are container-based recycle bins. In an aspect of this alternative embodiment users delete items from a web site to appropriate container-based recycle bins. As an example, a user delete of an item in a library on a web site causes the item to be deleted to a respective library recycle bin associated with the library the item was a member of on the web site. All write access users have access to a particular library recycle bin. Thus, all write access users can view a particular library recycle bin, delete items from the web site to the library recycle bin, delete items from the library recycle bin to a second stage recycle bin 140, or restore items in the library recycle bin to the web site.

In this alternative embodiment, a user delete from the web site also causes the item to be deleted to a first stage recycle bin 130. When a user deletes an item from a library recycle bin it is deleted to a second stage recycle bin 140. Users do not have access to the second stage recycle bin 140, but one or more web site administrators can access the second stage recycle bin 140. In this embodiment, an appropriate web site administrator can permanently delete items from the second stage recycle bin 140 or, alternatively, restore items in the second stage recycle bin 140 to the web site.

In an embodiment, various attributes of the multi-stage recycling, such as, but not limited to, the automatic cleanup service properties, including the programmable timer and the programmable initiation of the automatic cleanup service, the programmable second stage storage quota, and the enable/disable feature of the second stage recycle bin 140 or all the user recycle bins 120, the first stage recycle bin 130 and the second stage recycle bin 140, can be interacted with and extended as necessary for the functioning of, or improved functioning of, any particular web site.

Computer System Configuration

Figure 12:
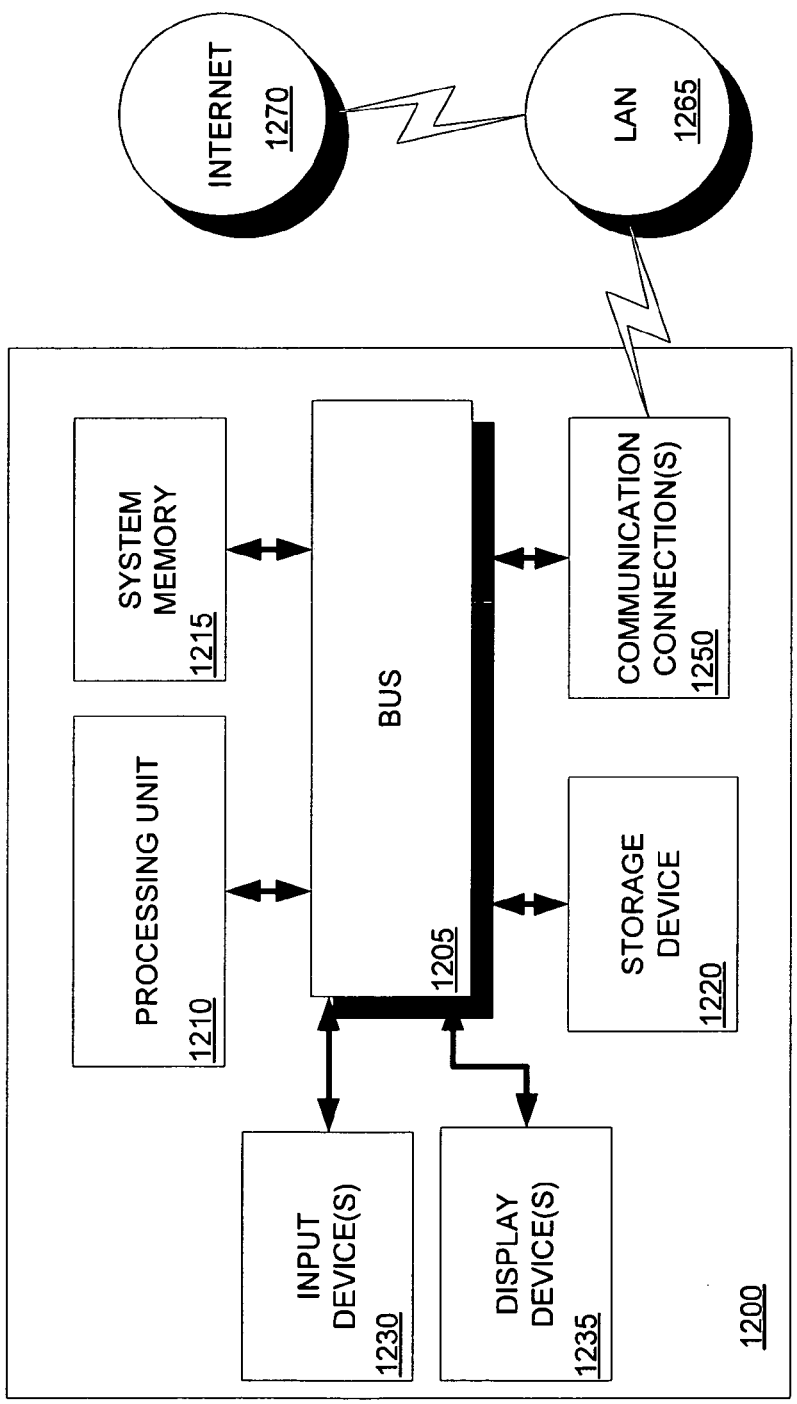
FIG. 12 is a block diagram of an exemplary basic computer system that can process computer software, i.e., program code, or instructions.

FIG. 12 is a block diagram that illustrates an exemplary computer system 1200 upon which an embodiment can be implemented. The computer system 1200 includes a bus 1205 or other mechanism for communicating information, and a processing unit 1210 coupled with the bus 1205 for processing information. The computer system 1200 also includes system memory 1215, which may be volatile or dynamic, such as random access memory (RAM), non-volatile or static, such as read-only memory (ROM) or flash memory, or some combination of the two. The system memory 1215 is coupled to the bus 1205 for storing information and instructions to be executed by the processing unit 1210, and may also be used for storing temporary variables or other intermediate information during the execution of instructions by the processing unit 1210. The system memory 1215 often contains an operating system and one or more programs, and may also include program data.

In an embodiment, a storage device 1220, such as a magnetic or optical disk, is also coupled to the bus 1205 for storing information, including program code comprising instructions and/or data.

The computer system 1200 generally includes one or more display devices 1235, such as, but not limited to, a display screen, e.g., a cathode ray tube (CRT) or liquid crystal display (LCD), a printer, and one or more speakers, for providing information to a computer user. The computer system 1200 also generally includes one or more input devices 1230, such as, but not limited to, a keyboard, mouse, trackball, pen, voice input device(s), and touch input devices, which a computer user can use to communicate information and command selections to the processing unit 1210. All of these devices are known in the art and need not be discussed at length here.

The processing unit 1210 executes one or more sequences of one or more program instructions contained in the system memory 1215. These instructions may be read into the system memory 1215 from another computer-readable medium, including, but not limited to, the storage device 1220. In alternative embodiments, hard-wired circuitry may be used in place of or in combination with software program instructions. Thus, the computer system environment is not limited to any specific combination of hardware circuitry and software.

The term "computer-readable medium" as used herein refers to any medium that can participate in providing program instructions to the processing unit 1210 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punchcards, papertape, or any other physical medium with patterns of holes, memory chip, or cartridge. The system memory 1215 and storage device 1220 of the computer system 1200 are further examples of storage media. Examples of transmission media include, but are not limited to, wired media such as coaxial cable(s) and copper wire, and wireless media such as fiber optic signals, acoustic signals, RF signals and infrared signals.

The computer system 1200 also includes one or more communication connections 1250 coupled to the bus 1205. The communication connection(s) 1250 provide a two-way data communication coupling from the computer system 1200 to other computer systems and/or computing devices on a local area network (LAN) 1265 and/or wide area network (WAN), including the World Wide Web, or Internet 1270. Examples of the communication connection(s) 1250 include, but are not limited to, an integrated services digital network (ISDN) card, modem, LAN card, and any device capable of sending and receiving electrical, electromagnetic, optical, acoustic, RF or infrared signals.

Communications received by the computer system 1200 can include program instructions and program data. The program instructions received by the computer system 1200 may be executed by the processing unit 1210 as they are received, and/or stored in the storage device 1220 or other non-volatile storage for later execution.

CONCLUSION

While various embodiments are described herein, these embodiments have been presented by way of example only, and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for recycling bin maintenance, the method comprising:

removing an item from display on web site upon a user's first delete of the item, wherein the first delete is a user delete of the item on the web site;

indicating the item in a user recycle bin upon the user's first delete of the item;

indicating the item is a second recycle bin upon the user's first delete of the item;

cease indicating the item in the user recycle bin upon a second delete of the item, wherein the second delete is a user delete of the item from the user recycle bin;

cease indicating the item in the second recycle bin upon the second delete of the item;

indicating the item in a third recycle bin upon the second delete of the item, the item remaining associated with the web site and protected from being overwritten;

cease indicating the item in the third recycle bin upon a third delete of the item, wherein the third delete is a delete of the item from the third recycle bin; and deleting the item from the web site upon the third delete of the item, thereby disassociating the item from the web site and allowing the item to be overwritten.

2. The method for recycle bin maintenance of claim 1, wherein the second recycle bin is a web site administrator's first stage recycle bin and the third recycle bin is a web site administrator's second stage recycle bin.

3. The method for recycle bin maintenance of claim 1, further comprising ceasing to indicate the item in any of the user recycle bin, second recycle bin or third recycle bin and deleting the item from the web site upon the expiration of a time established by an automatic cleanup timer.

4. The method for recycle bin maintenance of claim 3, wherein the automatic cleanup timer can be set by a web site administrator.

5. The method for recycle bin maintenance of claim 1, wherein the web site comprises a web site quota which is the amount of storage allocated to the web site, the third recycle bin comprises a second stage storage quota which is an amount of storage associated with the third recycle bin, and the third recycle bin further comprises a second stage used amount which is the amount of storage used by items indicated in the third recycle bin, and wherein the second stage storage quota can be set by a web site administrator to a percentage of the web site quota.

6. The method for recycle bin maintenance of claim 5, further comprising:
   upon the second delete of the item, checking if the size of the item is larger than the second stage storage quota for the third recycle bin;
   upon the second delete of the item and when the item is not larger than the second stage storage quota, checking if the size of the item is larger than the difference between the second stage storage quota and the second stage used amount for the third recycle bin; and
   upon the second delete of the item and when the item is not larger than the difference between the second stage storage quota and the second stage used amount, indicating the item in the third recycle bin.

7. The method for recycle bin maintenance of claim 5, wherein the item is a first item and the user is a first user, further comprising:
   removing a second item from the web site upon a second user's first delete of the second item;
   indicating the second item in the second recycle bin upon the second user's first delete of the second item;
   upon the second user's second delete of the second item, checking if the size of the second item is larger than the second stage storage quota for the third recycle bin; and
   upon the second user's second delete of the second item and when the second item is larger than the second stage storage quota, permanently deleting the second item from the web site.

8. The method for recycle bin maintenance of claim 7, further comprising:
   removing a third item from the web site upon a third user's first delete of the third item;
   indicating the third item in the second recycle bin upon the third user's first delete of the third item;
   upon a second delete of the third item, checking if the size of the third item is larger than the second stage storage quota for the third recycle bin;
   upon the second delete of the third item and when the third item is not larger than the second stage storage quota, checking if the size of the third item is larger than a free space allocation for the third recycle bin, wherein the free space allocation for the third recycle bin is the difference between the second stage storage quota and the second stage used amount for the third recycle bin; and
   upon the second delete of the third item and when the third item is larger than the free space allocation for the third recycle bin, identifying the oldest item indicated in the third recycle bin and deleting this oldest item from the third recycle bin;
   upon the second delete of the third item and after deleting the oldest item from the third recycle bin, rechecking if the size of the third item is larger than the free space allocation for the third recycle bin; and
   upon the second delete of the third item and when the size of the third item is not larger than the free space allocation for the third recycle bin after deleting the oldest item from the third recycle bin, indicating the third item in the third recycle bin.

9. The method for recycle bin maintenance of claim 8, wherein any of the first user, the second user and the third user can be the same user of the web site.

10. The method for recycle bin maintenance of claim 1, wherein the web site comprises a web site quota which is the amount of storage allocated to the web site, a recycle bin quota which is the amount of storage associated with the user recycle bin, the second recycle bin and the third recycle bin, the site used space amount which is the amount of storage used by live items on the web site, and a recycle bin used amount which is the amount of storage used by items indicated in the user recycle bin, the second recycle bin and the third recycle bin, and wherein the recycle bin quota can be set by a web site administrator.

11. The method for recycle bin maintenance of claim 1, wherein the user's recycle bin, the second recycle bin and the third recycle bin are each a view of a recycle bin table.

12. The method of claim 1, further comprising:
   cease indicating the item in the third recycle bin upon a web site administrator's restoration of the item to the web site; and
   restoring the item to the web site so the item can be accessed by the user upon the web site administrator's restoration of the item to the web site.

13. The method for recycle bin maintenance of claim 1, wherein the item is a first item and a second item is a dependent item of the first item, further comprising:
   removing the second item from the web site upon the user's first delete of the first item; and
   permanently deleting the second item from the web site when the first item is permanently deleted from the web site.

14. The method for recycle bin maintenance of claim 1, further comprising:
   removing a second item from the web site upon the user's first delete of the second item;
   removing a third item from the web site upon the user's first delete of the second item, wherein the third item is a dependent item of the second item;
   indicating the second item in the user's recycle bin upon the user's first delete of the second item;
   indicating the second item in the second recycle bin upon the user's first delete of the second item;
   cease indicating the second item in the user's recycle bin upon a second delete of the second item;
   cease indicating the second item in the second recycle bin upon the second delete of the second item;

indicating the second item in the third recycle bin upon the second delete of the second item;

cease indicating the second item in the third recycle bin upon a web site administrator's restoration of the second item to the web site;

restoring the second item to the web site so the second item can be seen on the web site and accessed by the user upon the web site administrator's restoration of the second item to the web site; and restoring the third item to the web site upon the web site administrator's restoration of the second item to the web site.

15. A method for multi-stage recycle for a web site, the method comprising:

showing an item in a user's recycle bin upon the user's first delete of the item, wherein the first delete is a delete of the item from a web site;

showing the item in a first stage administrator recycle bin upon the user's first delete of the item;

discontinuing to show the item in the user's recycle bin upon the user's second delete of the item, wherein the second delete is a delete from the user's recycle bin;

discontinuing to show the item in the first stage administrator recycle bin upon the user's second delete of the item;

showing the item in a second stage administrator recycle bin upon the user's second delete of the item, the item remaining associated with the web site and protected from being overwritten;

discontinuing to show the item in the second stage administrator recycle bin upon a web site administrator's delete of the item from the second stage administrator recycle bin; and permanently deleting the item from the web site upon the web site administrator's delete of the item from the second stage administrator recycle bin, thereby disassociating the item from the web site and allowing the item to be overwritten.

16. The method for multi-stage recycling for a web site of claim 15, further comprising discontinuing to show the item in the second stage administrator recycle bin and removing the item from the web site upon the expiration of a span of time, wherein the amount of the span of time is set by a web site administrator to an amount of time an item can be shown in any of a user's recycle bin, the first stage administrator recycle bin or the second stage administrator recycle bin.

17. The method for multi-stage recycling for a web site of claim 15, wherein the web site comprises a web site quota which is the amount of storage allocated to the web site, the second stage administrator recycle bin comprises a second stage storage quota which is an amount of storage associated with the second stage administrator recycle bin, and the second stage administrator recycle bin further comprises a free space allocation which is the difference between the second stage storage quota and the amount of storage used by items shown in the second stage administrator recycle bin, the method further comprising:

upon the user's second delete of the item, checking if the size of the item is larger than the second stage storage quota;

upon the user's second delete of the item and when the item is not larger than the second stage storage quota, checking if the size of the item is larger than the free space allocation; and upon the user's second delete of the item and when the item is not larger than the free space allocation, showing the item in the second stage administrator recycle bin.

18. A method for recycle bin maintenance, the method comprising:

removing an item from a web site upon a first delete of the item;

indicating the item in a first recycle bin upon the first delete of the item;

indicating the item in a second recycle bin upon the first delete of the item;

cease indicating the item in the first recycle bin upon a second delete of the item;

cease indicating the item in the second recycle bin upon the second delete of the item;

indicating the item in a third recycle bin upon the second delete of the item the item remaining associated with the web site and protected from being overwritten;

cease indicating the item in the third recycle bin upon a third delete of the item; and permanently deleting the item from the web site upon the third delete of the item, thereby disassociating the item from the web site.

19. The method for recycle bin maintenance of claim 18, wherein the web site is a collaborative web site.

20. The method for recycle bin maintenance of claim 18, wherein the first recycle bin is a user recycle bin, the second recycle bin is a web site first stage recycle bin and the third recycle bin is a web site second stage recycle bin.

21. The method for recycle bin maintenance of claim 18, further comprising overwriting the item in a memory with a second item.

22. The method for recycle bin maintenance of claim 18, wherein the first recycle bin, the second recycle bin and the third recycle bin are each a view of a recycle bin table.

* * * * *